(12) United States Patent
Kim et al.

(10) Patent No.: US 10,225,035 B2
(45) Date of Patent: Mar. 5, 2019

(54) METHOD FOR TRANSCEIVING SHORTENED PHYSICAL DOWNLINK SHARED CHANNEL IN WIRELESS ACCESS SYSTEM SUPPORTING UNLICENSED BAND, AND DEVICE SUPPORTING SAME

(71) Applicant: LG ELECTRONICS INC., Seoul (KR)

(72) Inventors: Seonwook Kim, Seoul (KR); Joonkui Ahn, Seoul (KR); Kijun Kim, Seoul (KR); Suckchel Yang, Seoul (KR); Hanbyul Seo, Seoul (KR); Seungmin Lee, Seoul (KR); Hanjun Park, Seoul (KR); Hyangsun You, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/539,014

(22) PCT Filed: Dec. 23, 2015

(86) PCT No.: PCT/KR2015/014192
§ 371 (c)(1),
(2) Date: Jun. 22, 2017

(87) PCT Pub. No.: WO2016/105129
PCT Pub. Date: Jun. 30, 2016

(65) Prior Publication Data
US 2018/0019836 A1    Jan. 18, 2018

Related U.S. Application Data

(60) Provisional application No. 62/095,782, filed on Dec. 23, 2014, provisional application No. 62/202,168,
(Continued)

(51) Int. Cl.
*H04J 11/00* (2006.01)
*H04W 88/18* (2009.01)
(Continued)

(52) U.S. Cl.
CPC ....... *H04J 11/0079* (2013.01); *H04J 11/0083* (2013.01); *H04L 5/0094* (2013.01); *H04L 27/2602* (2013.01); *H04W 88/18* (2013.01); *H04J 11/0053* (2013.01); *H04W 24/10* (2013.01)

(58) Field of Classification Search
CPC .............. H04J 11/0079; H04J 11/0053; H04J 11/0083; H04W 24/10; H04W 88/18; H04L 5/0094; H04L 27/2602
(Continued)

(56) References Cited

U.S. PATENT DOCUMENTS

2013/0286907 A1   10/2013   Wei et al.
2014/0161082 A1*  6/2014   Gao .................. H04W 72/1263
                                                      370/329
(Continued)

FOREIGN PATENT DOCUMENTS

WO    WO 2013/006006 A2    1/2013
WO    WO 2013/113158 A1    8/2013
WO    WO 2014/112937 A1    7/2014

*Primary Examiner* — Raymond S Dean
(74) *Attorney, Agent, or Firm* — Birch, Stewart, Kolasch & Birch, LLP

(57) ABSTRACT

The present invention relates to a wireless access system supporting an unlicensed band, a method for configuring a shortened physical downlink shared channel (sPDSCH), a method for scheduling same, methods for transceiving same, and devices supporting same. A method for receiving a sPDSCH in a wireless access system supporting an unlicensed band, according to one embodiment of the present invention, comprising the steps of: monitoring a common search space for detecting downlink control information (DCI) comprising length information of a sPDSCH which is set in an unlicensed-band cell (Ucell) supporting an unli- (Continued)

censed band; receiving the DCI through the common search space; and receiving the sPDSCH on the basis of the length information, wherein the sPDSCH is received on a partial subframe (pSF), and the pSF may have a smaller size then a regular subframe.

8 Claims, 19 Drawing Sheets

Related U.S. Application Data filed on Aug. 7, 2015, provisional application No. 62/207,899, filed on Aug. 20, 2015, provisional application No. 62/237,588, filed on Oct. 6, 2015.

(51) Int. Cl.
*H04L 5/00* (2006.01)
*H04L 27/26* (2006.01)
*H04W 24/10* (2009.01)

(58) Field of Classification Search
USPC .............................. 455/515, 78, 500.1
See application file for complete search history.

(56) References Cited

U.S. PATENT DOCUMENTS

2014/0226609 A1    8/2014  Hooli et al.
2017/0164384 A1*  6/2017  Wang ................ H04W 72/1289

* cited by examiner

FIG. 9
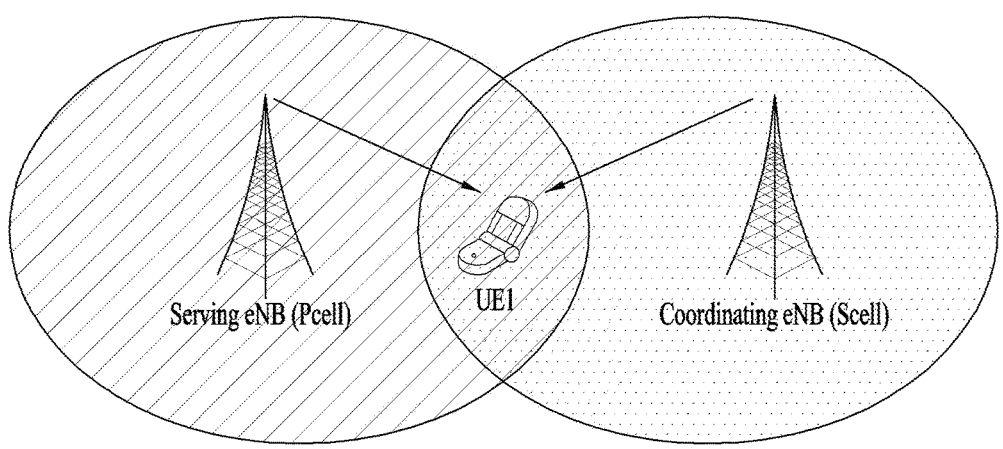
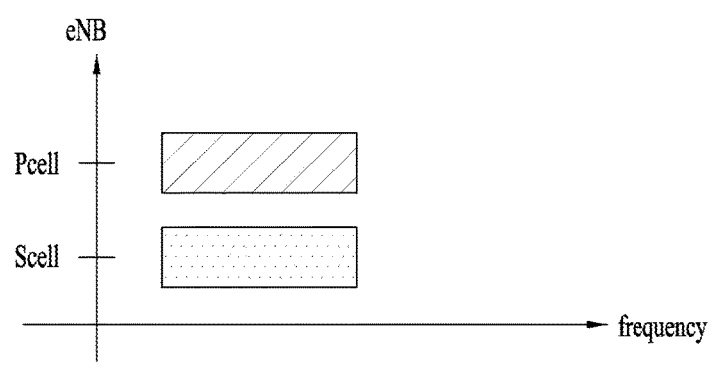

METHOD FOR TRANSCEIVING SHORTENED PHYSICAL DOWNLINK SHARED CHANNEL IN WIRELESS ACCESS SYSTEM SUPPORTING UNLICENSED BAND, AND DEVICE SUPPORTING SAME

CROSS REFERENCE TO RELATED APPLICATIONS

This application is the National Phase of PCT International Application No. PCT/KR2015/014192, filed on Dec. 23, 2015, which claims priority under 35 U.S.C. 119(e) to U.S. Provisional Application Nos. 62/095,782, filed on Dec. 23, 2014, 62/202,168 filed on Aug. 7, 2015, 62/207,899 filed on Aug. 20, 2015 and 62/237,588 filed on Oct. 6, 2015, all of which are hereby expressly incorporated by reference into the present application.

TECHNICAL FIELD

The present invention relates to a wireless access system supporting an unlicensed band, and more particularly, to a method of configuring a shortened physical downlink shared channel (sPDSCH), a method of scheduling the sPDSCH, methods of transceiving the sPDSCH, and devices supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

One object of the present invention is to provide a method of configuring a sPDSCH and a method of scheduling the sPDSCH.

Another object of the present invention is to propose a frame structure capable of being configured with a sPDSCH.

Another object of the present invention is to provide methods of transmitting a reservation signal when a sPDSCH is used.

Another object of the present invention is to provide methods of transceiving a reception confirmation signal (ACK/NACK) in response to a sPDSCH.

Another object of the present invention is to provide methods of estimating a channel when a sPDSCH is configured.

Another object of the present invention is to provide methods of configuring a subframe for performing tracking when a sPDSCH is used.

The other object of the present invention is to provide devices for supporting the methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention relates to a wireless access system supporting an unlicensed band, and more particularly, to a method of configuring a shortened physical downlink shared channel (sPDSCH), a method of scheduling the sPDSCH, methods of transceiving the sPDSCH, and devices supporting the same.

To achieve these and other advantages and in accordance with the purpose of the present invention, as embodied and broadly described, according to one embodiment, a method for receiving a sPDSCH in a wireless access system supporting an unlicensed band, includes the steps of monitoring a common search space to detect downlink control information (DCI) including length information on the sPDSCH which is set to an unlicensed band cell(UCell) supporting the unlicensed band, receiving the DCI via the common search space, and receiving the sPDSCH based on the length information. In this case, the sPDSCH is received in a partial subframe (pSF) and the pSF can be configured by a size smaller than a size of a normal subframe.

To further achieve these and other advantages and in accordance with the purpose of the present invention, according to a different embodiment, a user equipment for receiving a sPDSCH in a wireless access system supporting an unlicensed band, includes a receiver and a processor configured to support reception of the sPDSCH, the processor configured to control the receiver to monitor a common search space to detect DCI including length information on the sPDSCH which is set to a UCell supporting the unlicensed band, the processor configured to control the receiver to receive the DCI via the common search space, the processor configured to control the receiver to receive the sPDSCH based on the length information. In this case, the sPDSCH is received in a pSF and the pSF can be configured by a size smaller than a size of a normal subframe.

The sPDSCH may correspond to an ending sPDSCH which ends prior to a subframe boundary of the UCell corresponding to a subframe boundary of a primary cell (Pcell) configured on a licensed band.

The sPDSCH can be scheduled by a self-carrier scheduling scheme or a cross-carrier scheduling scheme.

The common search space can be configured in the UCell of the unlicensed band.

The above-described aspects of the present disclosure are merely some parts of the embodiments of the present disclosure and various embodiments into which the technical features of the present disclosure are incorporated may be derived and understood by persons skilled in the art from the following detailed description of the present disclosure.

Advantageous Effects

Accordingly, the present invention provides the following effects or advantages.

Accordingly, the present invention provides the following effects or advantages.

First of all, although a Pcell is not matched with a boundary in an unlicensed band, it is able to efficiently use a radio resource by utilizing a frame structure using a sPDSCH, a scheduling method, and the like.

Second, it is able to prevent a channel from being suddenly occupied by a different system by providing methods of transmitting a reservation signal in case of using a sPDSCH.

Third, it is able to reliably transmit and receive a sPDSCH by providing methods of transmitting and receiving a reception confirmation signal (ACK/NACK) in response to the sPDSCH.

Fourth, although a sPDSCH is configured, it is able to guarantee successful data decoding through a channel estimated by a UE.

Fifth, in case of using a sPDSCH, it is able to precisely receive the sPDSCH by providing methods of configuring a subframe for performing tracking.

Sixth, it is able to receive DCI including length information on a sPDSCH through a common search space.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings. That is, those skilled in the art can derive unintended effects resulting from implementation of the present disclosure from the embodiments of the present disclosure.

DESCRIPTION OF DRAWINGS

The accompanying drawings, which are included to provide a further understanding of the disclosure, illustrate embodiments of the disclosure and together with the description serve to explain the principle of the disclosure. In the drawings:

FIG. 9 is a view illustrating one of methods for transmitting a Sounding Reference Signal (SRS) used in embodiments of the present disclosure;

BEST MODE

MODE FOR INVENTION

Figure 1:
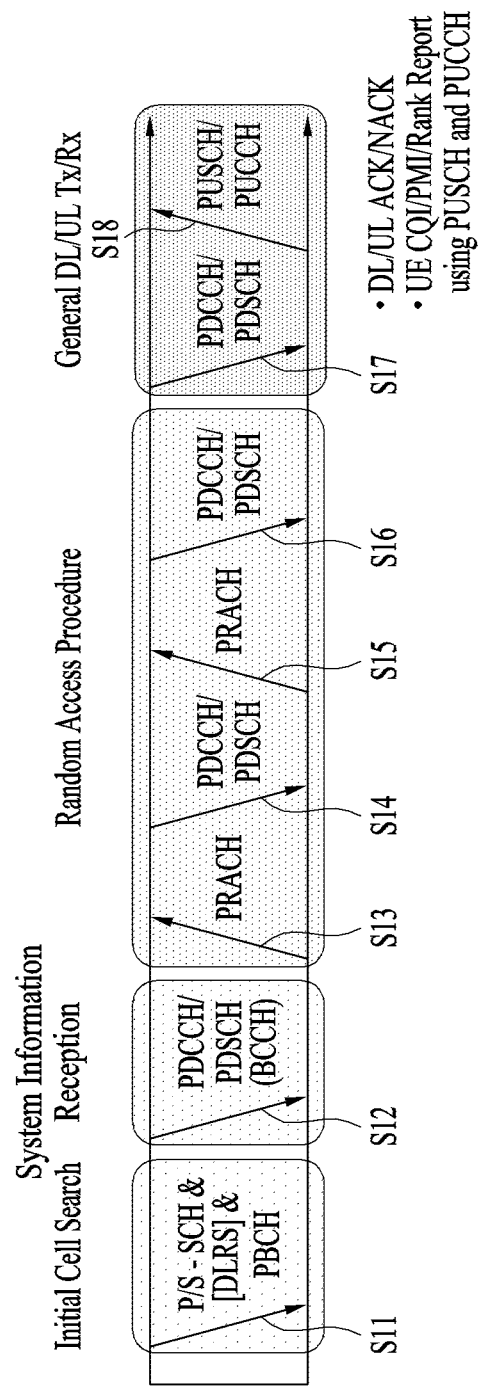
FIG. 1 is a view illustrating physical channels and a signal transmission method using the physical channels.

The present invention relates to a wireless access system supporting an unlicensed band, and more particularly, to a method of configuring a shortened physical downlink shared channel (sPDSCH), a method of scheduling the sPDSCH, methods of transceiving the sPDSCH, and devices supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing (CS) procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ- ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
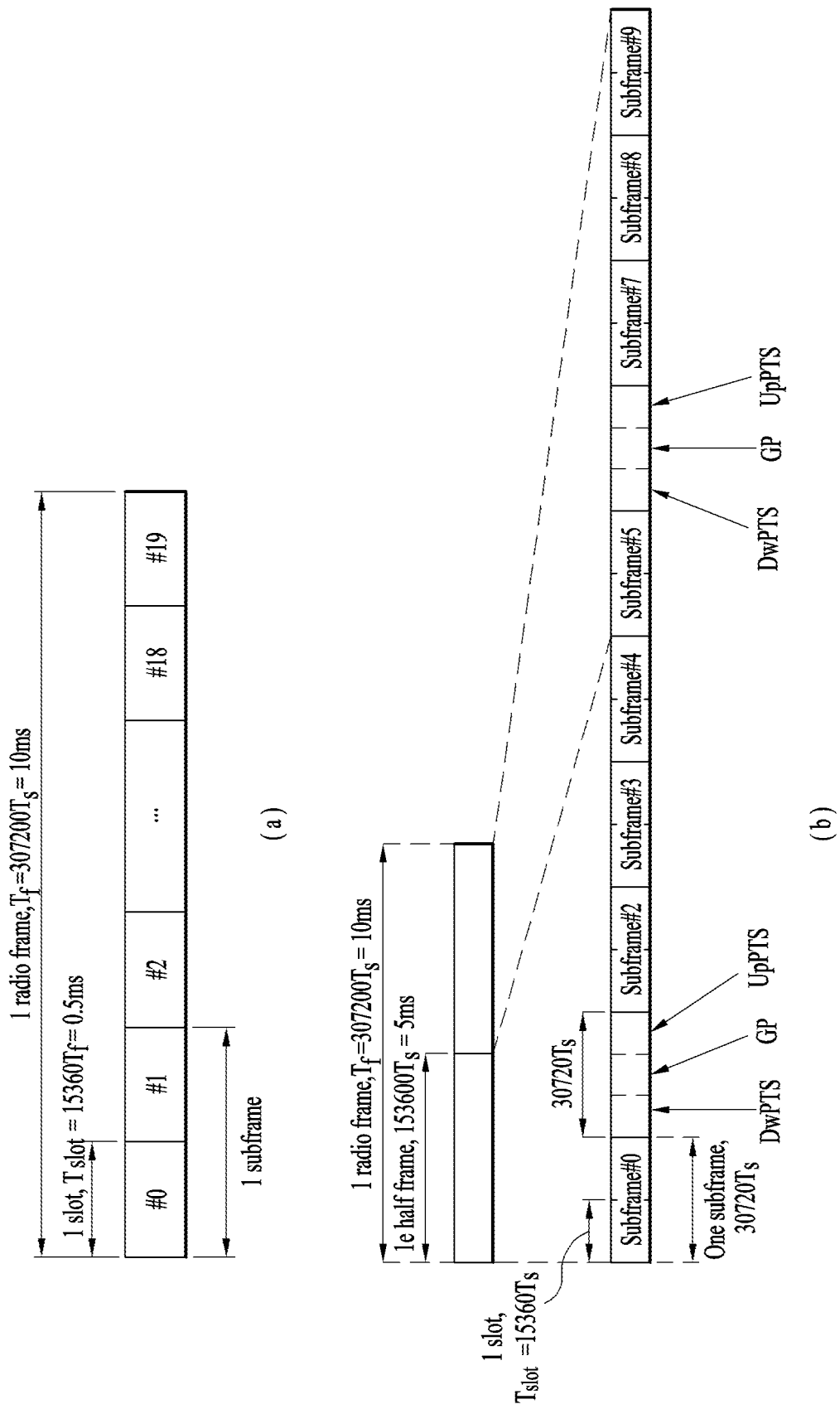
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5ms (Tslot=15360·Ts). Ts is a sampling time given as Ts=1/(15kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
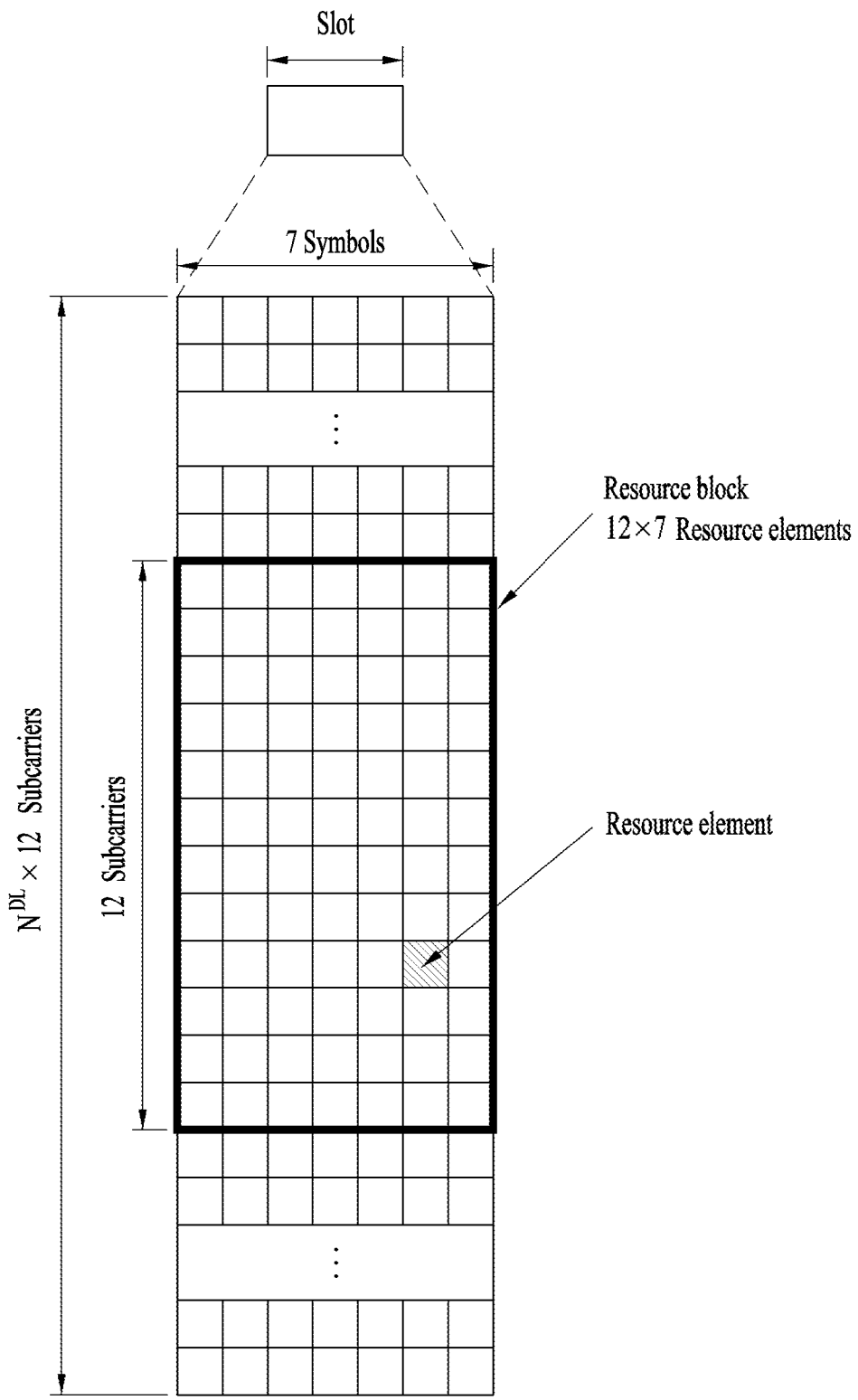
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
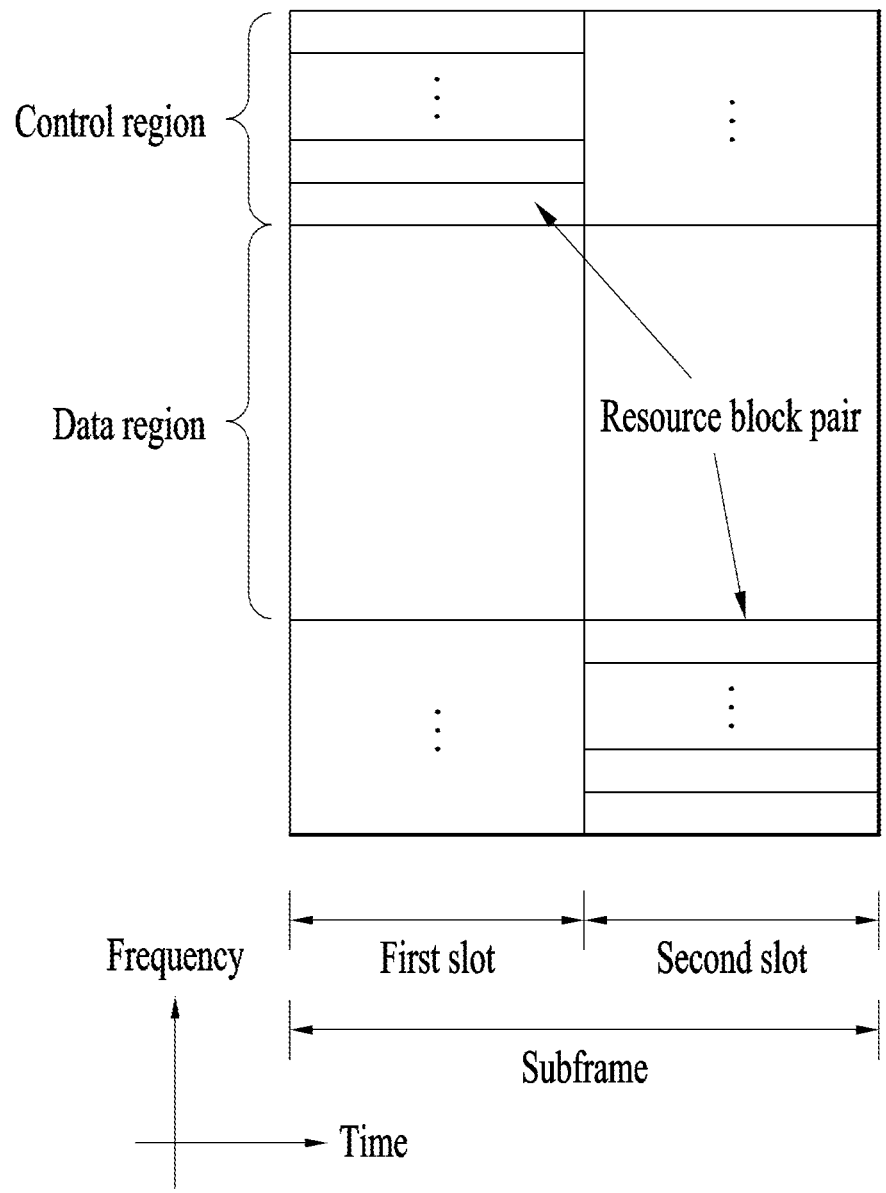
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
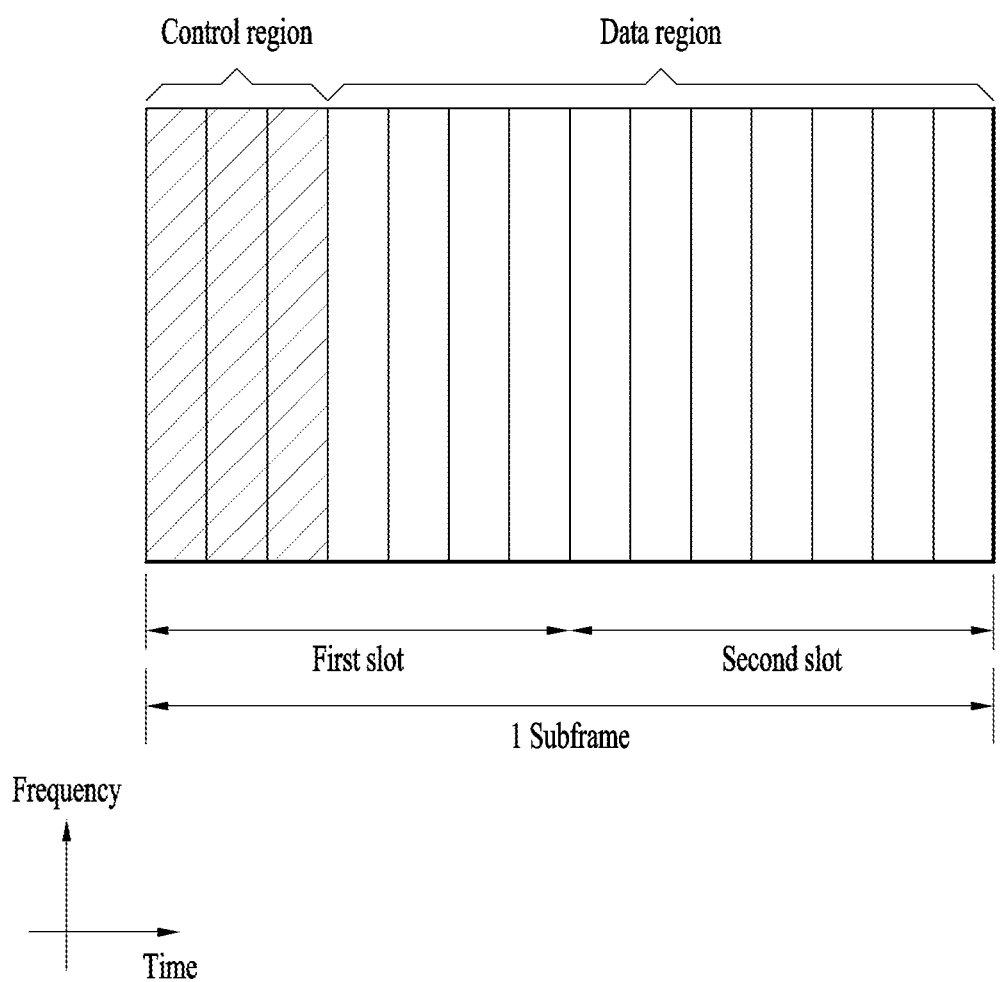
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{2,4,8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

Herein, $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$ $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, $Y_k$ whereas is defined by [Equation 2] for aggregation level L in the USS.

$$Y_k = (A \cdot Y_{k-1}) \bmod D \quad \text{[Equation 2]}$$

Herein, $Y_{-1} = n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CON- NECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellld is an integer value ranging from 0 to 503. A short ID of an SCell, SCelllndex is an integer value ranging from 1 to 7. A short ID of a serving cell (PCell or SCell), ServeCelllndex is an integer value ranging from 1 to 7. If ServeCelllndex is 0, this indicates a PCell and the values of ServeCelllndex for SCells are pre-assigned. That is, the smallest cell ID (or cell index) of ServeCelllndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
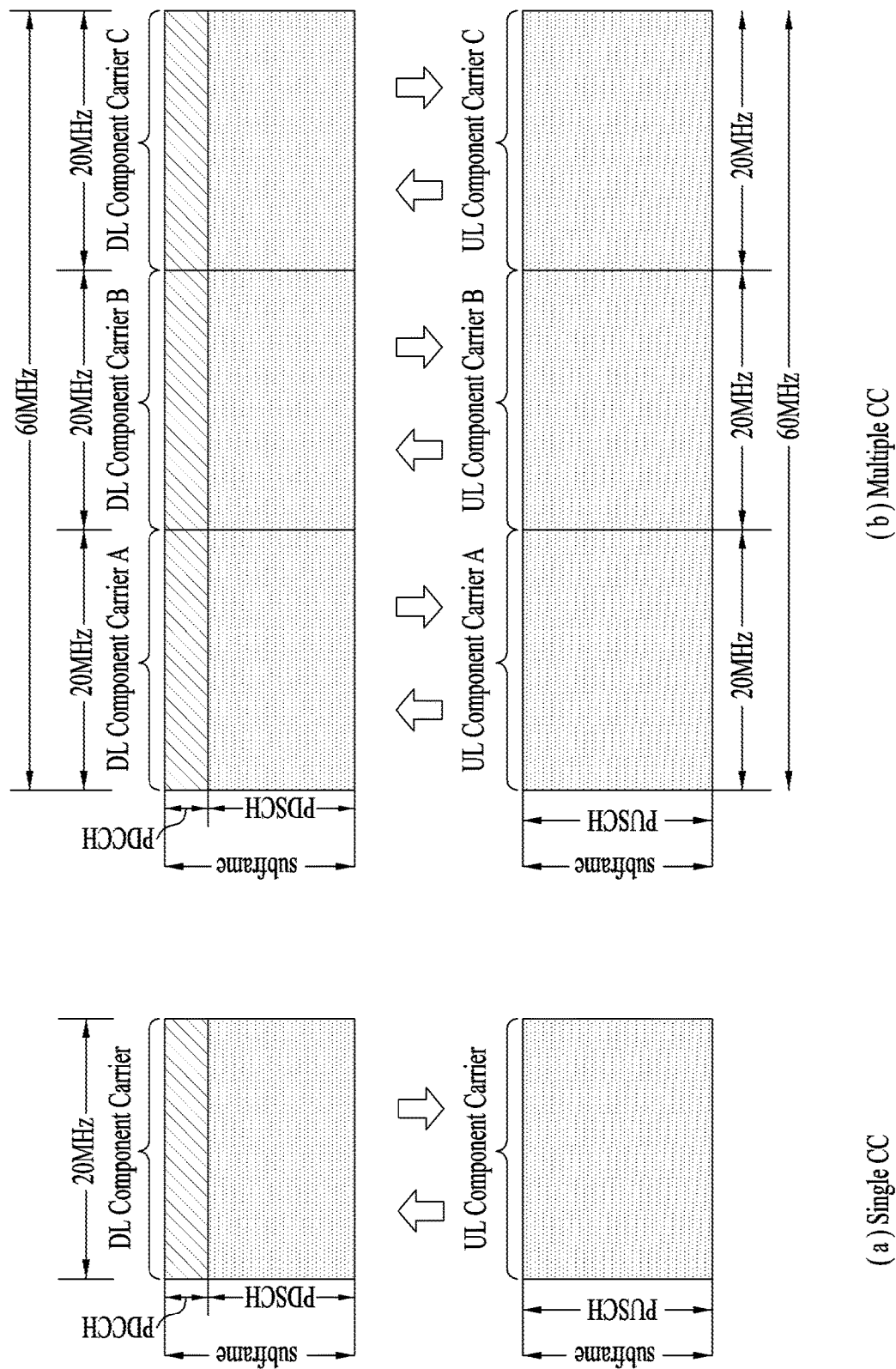
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(*a*) illustrates a single carrier structure in the LTE system. There are a DL CC and a UL CC and one CC may have a frequency range of 20 MHz.

FIG. 6(*b*) illustrates a CA structure in the LTE-A system. In the illustrated case of FIG. 6(*b*), three CCs each having 20MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross-Carrier Scheduling

Two scheduling schemes, self-scheduling and cross-carrier scheduling are defined for a CA system, from the perspective of carriers or serving cells. Cross-carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross-carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross-carrier scheduling may be activated or deactivated UE-specifically and indicated to each UE semi-statically by higher-layer signaling (e.g. RRC signaling).

If cross-carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross-carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross-carrier scheduling is deactivated, this implies that the PDCCH monitoring set is always identical to the UE DL CC set. In this case, there is no need for signaling the PDCCH monitoring set. However, if cross-carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
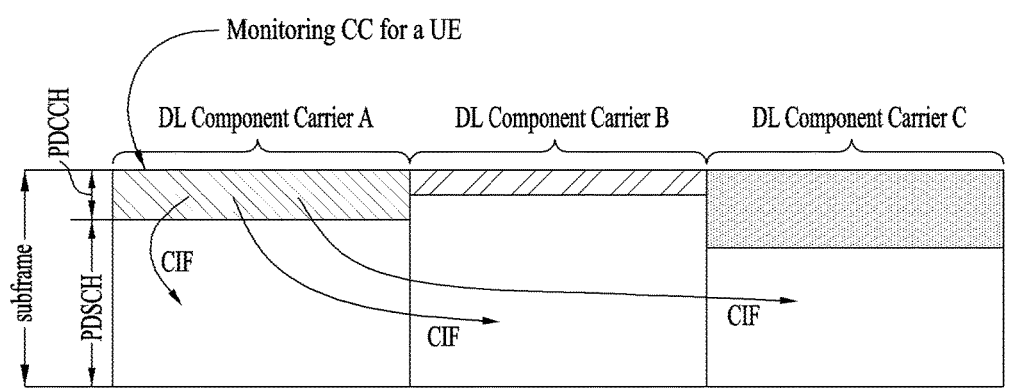
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
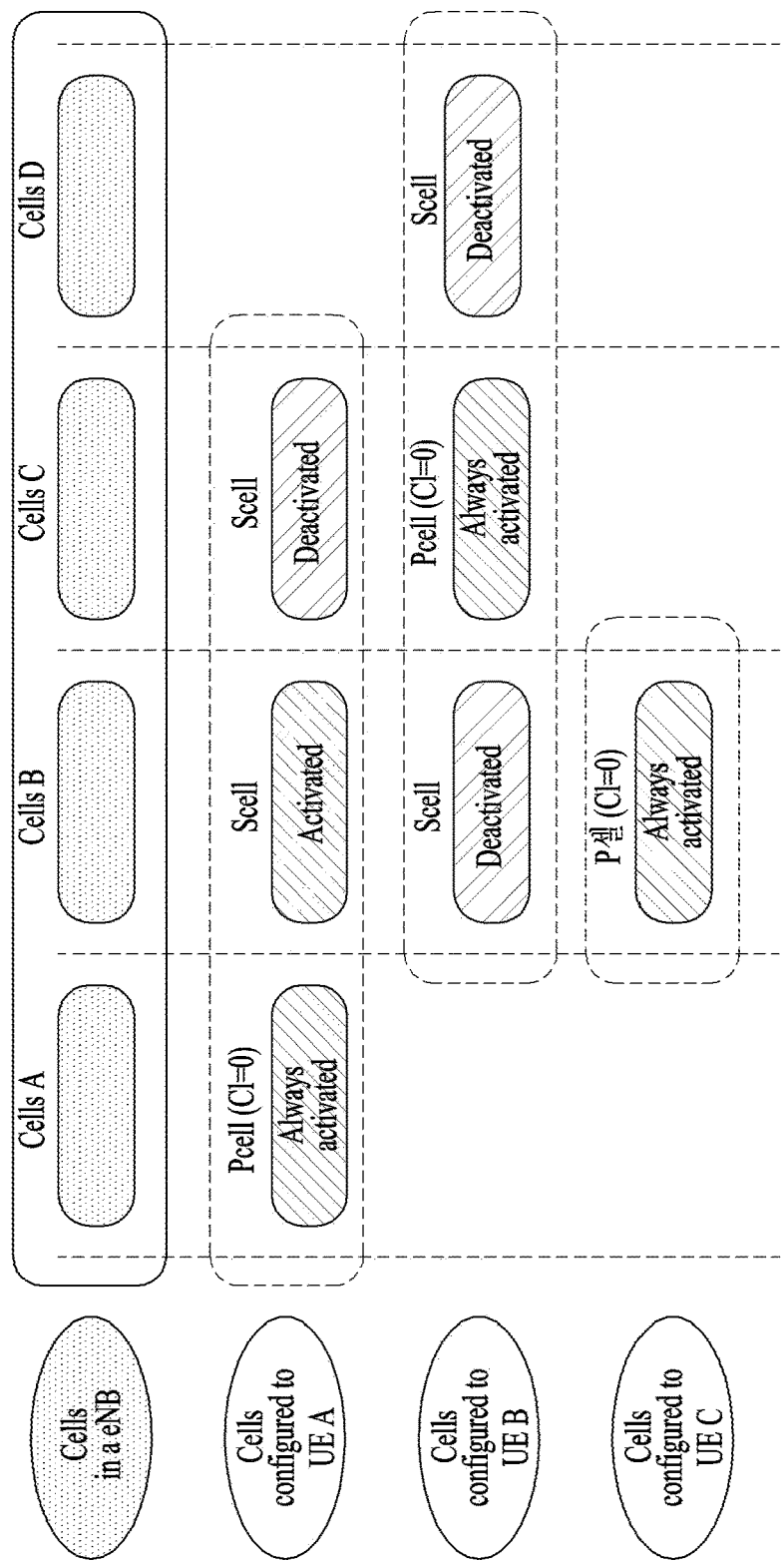
FIG. 8 is a view illustrating an exemplary serving cell configuration based on cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and Cell-specific Reference Signal (CRS) reporting and SRS transmission are interrupted.

2.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a CA function in the LTE. FIG. 9 is a conceptual view illustrating a CoMP system operating based on a CA environment.

In FIG. 9, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as Joint Transmission (JT), CS/CB and dynamic cell selection for one UE.

FIG. 9 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.4 Reference Signal (RS)

Hereinafter, reference signals are explained, which are used for the embodiments of the present invention.

Figure 10:
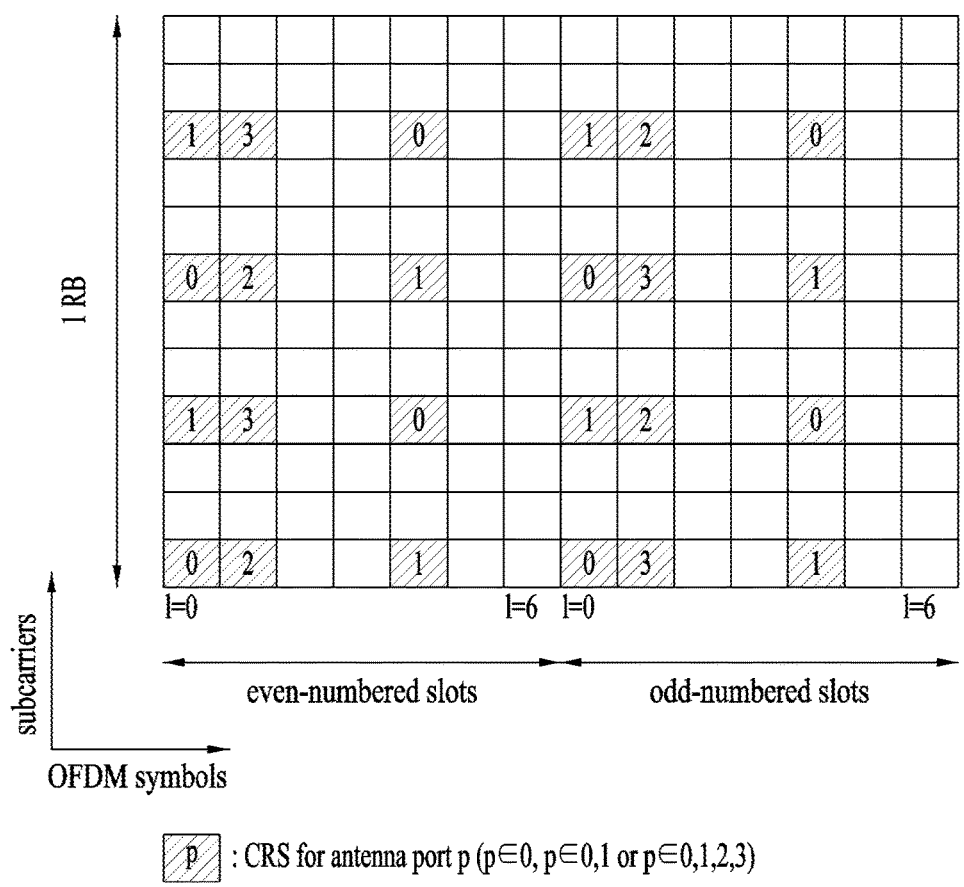
FIG. 10 is a view illustrating an exemplary subframe to which Cell-specific Reference Signals (CRSs) are allocated, which may be used in embodiments of the present disclosure.

FIG. 10 illustrates a subframe to which CRSs are allocated, which may be used in embodiments of the present disclosure.

FIG. 10 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot ns.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a Channel State Information Reference Signal (CSI-RS) are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 11:
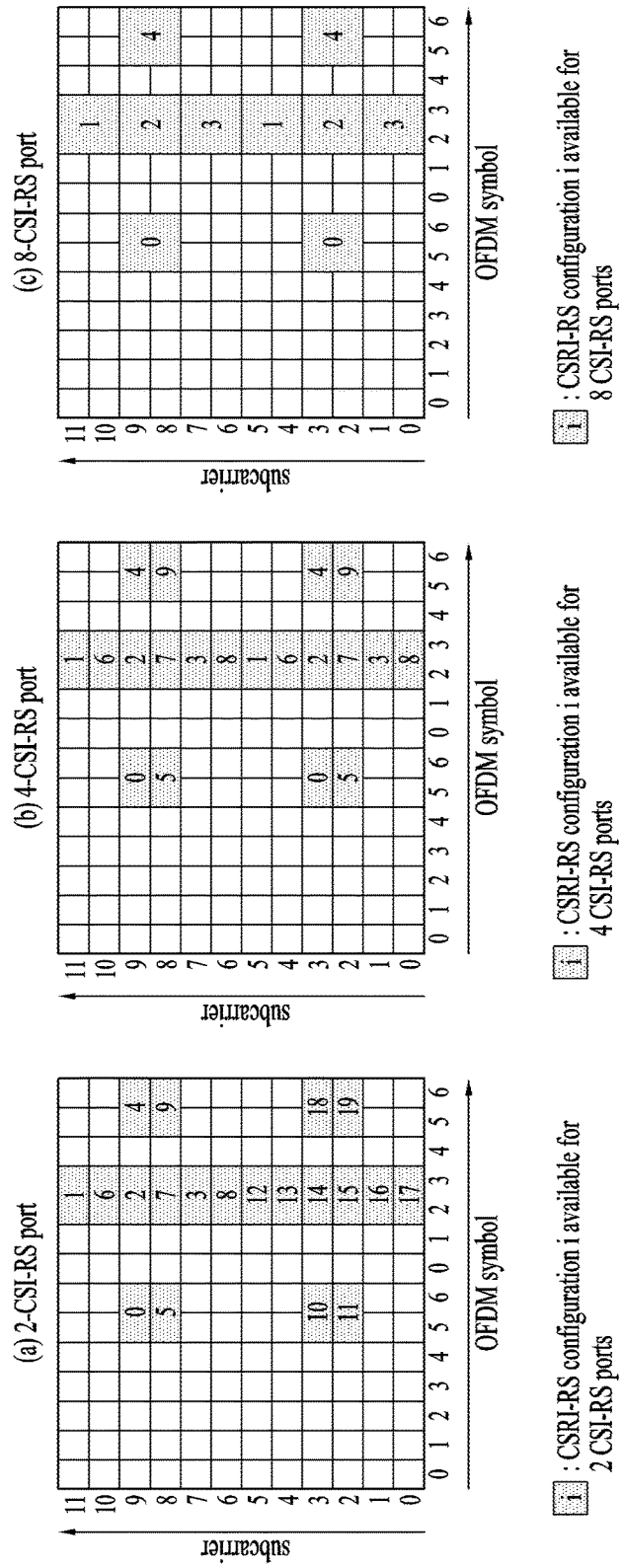
FIG. 11 is a view illustrating exemplary subframes to which Channel State Information Reference Signals (CSI-RSs) are allocated according to the number of antenna ports, which may be used in embodiments of the present disclosure.

FIG. 11 illustrates channel state information reference signal (CSI-RS) configurations allocated according to the number of antenna ports, which may be used in embodiments of the present disclosure.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence is mapped to complex modulation symbols used as RSs on antenna port p.

FIG. 11(a) illustrates 20 CSI-RS configurations 0 to 19 available for CSI-RS transmission through two CSI-RS ports among the CSI-RS configurations, FIG. 11(b) illustrates 10 available CSI-RS configurations 0 to 9 through four CSI-RS ports among the CSI-RS configurations, and FIG. 11(c) illustrates 5 available CSI-RS configurations 0 to 4 through 8 CSI-RS ports among the CSI-RS configurations.

The CSI-RS ports refer to antenna ports configured for CSI-RS transmission. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration is assigned and (2) a CSI-RS configuration varying according to a CSI-RS configuration number, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback Pc, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 6 shows CSI-RS subframe configuration $I_{CSI-RS}$ according to $T_{CSI-RS}$ and $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Subframes satisfying the following Equation 3 are subframes including CSI-RSs.

$$(10n_f + \lfloor n_s/2 \rfloor - \Delta_{CSI-RS}) \bmod T_{CSI-RS} = 0 \quad \text{[Equation 3]}$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

2. 5 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a Search Space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 12:
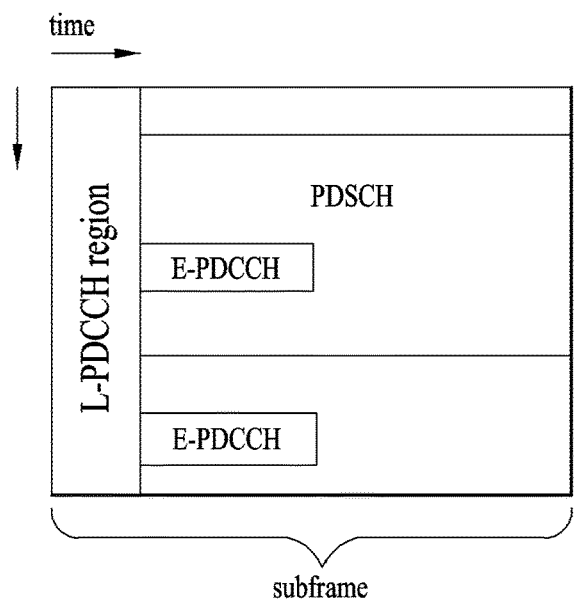
FIG. 12 is a view illustrating exemplary multiplexing of a legacy Physical Downlink Control Channel (PDCCH), a Physical Downlink Shared Channel (PDSCH), and an Enhanced PDCCH (EPDCCH) in an LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, Enhanced PDCCH (i.e., EPDCCH) multiplexed with a PDSCH more freely in a way of FDM/TDM may be introduced instead of a control channel such as PDCCH, which is transmitted through OFDM symbol and separated from PDSCH. FIG. 12 illustrates an example that legacy PDCCH, PDSCH and EPDCCH, which are used in an LTE/LTE-A system, are multiplexed.

2.6 Restricted CSI Measurement

To mitigate the effect of interference between cells in a wireless network, network entities may cooperate with each other. For example, other cells except a cell A transmit only common control information without transmitting data during the duration of a specific subframe for which the cell A transmits data, whereby interference with a user receiving data in the cell A may be minimized.

In this way, interference between cells may be mitigated by transmitting only minimal common control information from other cells except a cell transmitting data at a specific time through cooperation between cells in a network.

For this purpose, if a higher layer configures two CSI measurement subframe sets CCSI,0 and CCSI,1, a UE may perform Resource-Restricted Measurement (RRM). At this time, it is assumed that CSI reference resources corresponding to the two measurement subframe sets belong to only one of the two subframe sets.

The following Table 7 illustrates an example of a higher-layer signal that configures CSI subframe sets.

TABLE 7

```
CQI-ReportConfig-r10 ::=      SEQUENCE {
    cqi-ReportAperiodic-r10                  CQI-
ReportAperiodic-r10         OPTIONAL,    -- Need ON
    nomPDSCH-RS-EPRE-Offset                  INTEGER (-
1..6),
    cqi-ReportPeriodic-r10                   CQI-
ReportPeriodic-r10          OPTIONAL,    -- Need ON
    pmi-RI-Report-r9
ENUMERATED {setup}
OPTIONAL,    -- Cond PMIRIPCell
    csi-SubframePatternConfig-r10            CHOICE {
        release
NULL,
        setup
SEQUENCE {
            csi-MeasSubframeSet1-r10
MeasSubframePattern-r10,
            csi-MeasSubframeSet2-r10
MeasSubframePattern-r10
        }
    }
    OPTIONAL    -- Need ON
}
```

[Table 7] illustrates an example of CQI report configuration (CQI-Report Config) message transmitted to configure CSI subframe sets. The CQI-Report configuration message may include an aperiodic CQI report cqi-ReportAperiodic-r10 Information Element (IE), a nomPDSCH-RS-EPRE-Offset IE, a periodic CQI report cqi-ReportPeriodic-r10 IE, a PMI-RI report pmi-RI-Report-r9 IE, and a CSI subframe pattern configuration csi-subframePatternConfig IE. At this time, the CSI subframe pattern configuration IE includes CSI measurement subframe set 1 information csi-MeasSubframeSet1 IE and a CSI measurement subframe set 2 information csi-MeasSubframeSet2 IE, which indicate measurement subframe patterns for the respective subframe sets.

In this case, each of the csi-MeasSubframeSet1-r10 IE and the csi-MeasSubframeSet2-r10 IE is 40-bit bitmap information representing information on subframes belonging to each subframe set. Also, aperiodic CQI report CQI-ReportAperiodic-r10 IE is used to configure an aperiodic CQI report for the UE, and the periodic CQI report CQI-ReportPeriodic-r10 is used to configure a periodic CQI report for the UE.

The nomPDSCH-RS-EPRE-Offset IE indicates a value of $\Delta_{offset}$. AT this time, an actual value is set to $\Delta_{offset}$ value * 2 [dB]. Also, the PMI-RI report IE indicates configuration or non-configuration of a PMI/RI report. Only when a transmission mode is set to TM8, TM9, or TM10, the E-UTRAN configures the PMI-RI Report IE.

3. LTE Unlicensed (LTE-U) System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 13:
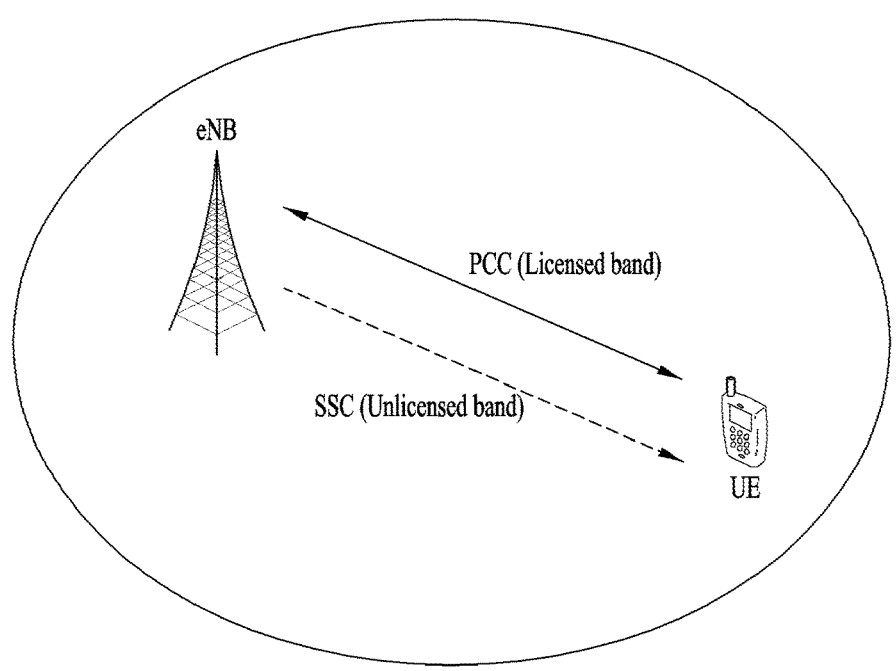
FIG. 13 is a view illustrating an exemplary CA environment supported in an LTE Unlicensed (LTE-U) system.

FIG. 13 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 13, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 13 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross-carrier scheduling mode and through PDCCH of the SCell in case of a self-scheduling mode, and may try data transmission and reception.

A CS procedure may be performed in the same manner as or a similar manner to a Listen Before Talk (LBT) procedure. In the LBT procedure, an eNB of a PCell determines whether the current state of a UCell (a cell operating in an unlicensed band) is busy or idle. For example, in the case where a Clear Channel Assessment (CCA) threshold is preset or configured by a higher-layer signal, if energy higher than the CCA threshold is detected in the UCell, the UCell is determined to be busy, and otherwise, the UCell is determined to be idle. If the UCell is determined to be idle, the eNB of the PCell may schedule resources of the UCell and perform data transmission and reception in the UCell by transmitting a scheduling grant (i.e., DCI or the like) on an (E)PDCCH of the PCell or a PDCCH of the UCell.

At this time, the eNB may configure a TxOP including N consecutive subframes. In this case, a value of N and a use of the N subframes may previously be notified from the eNB to the UE through higher layer signaling through the PCell or through a physical control channel or physical data channel. The TxOP duration comprised of M subframes may be referred to as a reserved resource period (RRP).

3.2 TxOP Duration

An eNB may transmit and receive data to and from one UE during a TxOP duration, and may configure a TxOP duration comprised of N consecutive subframes for each of a plurality of UEs and transmit and receive data in accordance with TDM or FDM. At this time, the eNB may transmit and receive data through a PCell which is a licensed band and an SCell which is an unlicensed band during the TxOP duration.

However, if the eNB transmits data in accordance with a subframe boundary of an LTE-A system corresponding to a licensed band, a timing gap may exist between an idle determination timing of the SCell which is an unlicensed band and an actual data transmission timing. Particularly, since the SCell should be used as an unlicensed band, which cannot be used exclusively by a corresponding eNB and a corresponding UE, through CS based contention, another system may try information transmission for the timing gap.

Therefore, the eNB may transmit a reservation signal from the SCell to prevent another system from trying information transmission for the timing gap. In this case, the reservation signal means a kind of "dummy information" or "a copy of a part of PDSCH" transmitted to reserve a corresponding resource region of the SCell as a resource of the eNB. The reservation signal may be transmitted for the timing gap (i.e., from the idle determination timing of the SCell to the actual transmission timing).

3.3 Method for Configuring TxOP Duration

Figure 14:
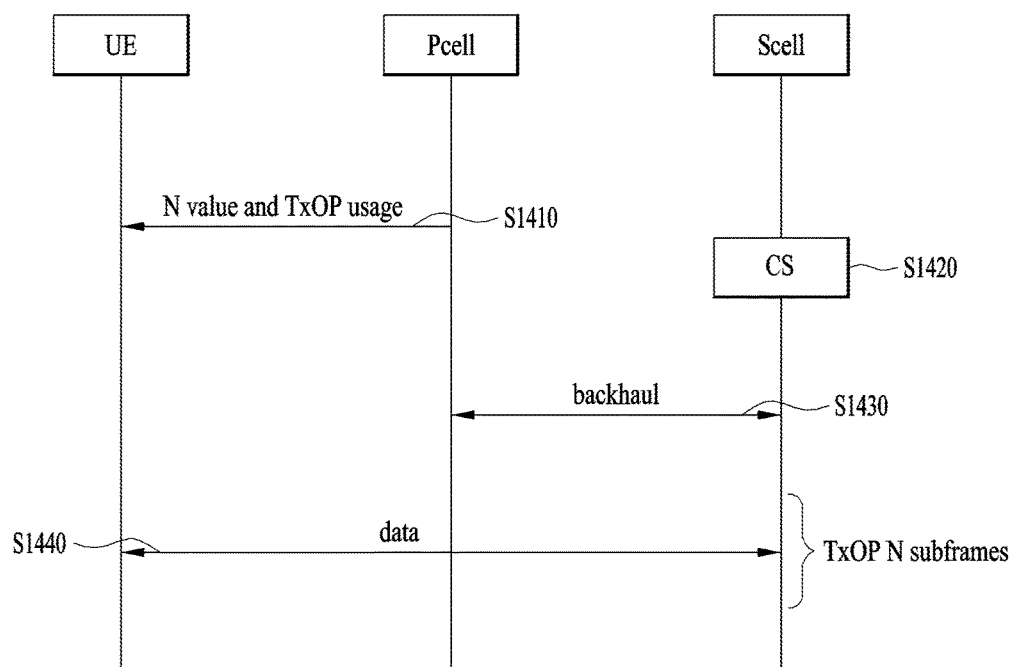
FIG. 14 is a diagram illustrating a signal flow for one of methods for configuring a Transmission Opportunity (TxOP)

FIG. 14 illustrates one of methods for configuring a TxOP duration.

An eNB may previously configure a TxOP duration semi-statically through a PCell. For example, the eNB may transmit a value of N corresponding to the number of subframes constituting the TxOP duration and configuration information on a use of the corresponding TxOP duration to a UE through a higher layer signal (for example, RRC signal) (S1410).

However, the step S1410 may be performed dynamically in accordance with system configuration. In this case, the eNB may transmit configuration information on the TxOP duration to the UE through a PDCCH or EPDCCH.

The SCell may perform a Carrier Sensing (CS) procedure to check whether a current channel state is an idle state or a busy state (S1420).

The PCell and the SCell may be managed by their respective eNBs different from each other or the same eNB. However, if the PCell and the SCell are managed by different base stations, information on a channel state of the SCell may be delivered to the PCell through a backhaul (S1430).

Afterwards, at a subframe configured as the TxOP duration, the UE may transmit and receive data through the PCell and the SCell. If the use of the corresponding TxOP is configured for downlink data transmission in step S1310, the UE may receive DL data through the SCell during the TxOP duration, and if the use of the corresponding TxOP is configured for uplink data transmission in step S1310, the UE may transmit UL data through the SCell (S1440).

In embodiments of the present disclosure, a TxOP duration may be used in the same meaning as a DL Transmission (Tx) burst, a DL burst, or an RRP. However, the DL burst or the DL Tx burst may cover a time period during which a reservation signal is transmitted for channel occupation.

4. Method of Configuring Partial Subframe and Method of Transmitting Data

The embodiments of the present invention relate to LTE-A system operating on an unlicensed band. In the embodiments of the present invention, the LTE-A system operating on an unlicensed band is referred to as a licensed assisted access (LAA) system. While a basic operation for LTE-LTE-A is performed as it is in the LAA system, the present invention provides methods of transceiving data with an LTE UE on an unlicensed band.

When WiFi systems or inter-operate systems coexisting in an unlicensed band using a contention-based access scheme are considered, if transmission start of subframes (SFs) of an Scell is permitted at a subframe (SF) boundary of a PCell, LTE-A system may considerably make other system occupy a channel. Hence, unlike a legacy LTE-A system, the LAA system can permit signal transmission to be started at a point rather than the SF boundary. In this case, a section in which signals are continuously transmitted can be defined as a data burst. The data burst can be used as a meaning identical to the aforementioned TxOP, the RRP, and the like.

The embodiments of the present invention relate to methods of configuring a partial SF (pSF) in a unit smaller than 1ms by starting signal transmission at timing rather than a SF boundary and methods of terminating data transmission at timing rather than the SF boundary. In this case, PDSCH transmitted in the pSF can be referred to as a shortened PDSCH (sPDSCH).

First of all, available frame structures of sPDSCH are listed and a structure of the sPDSCH for each of the frame structures, a scheduling method, a DCI configuration, channel estimation, and methods of transmitting ACK/NACK are explained in the following.

In the embodiments of the present invention, (s)PDSCH corresponds to sPDSCH and/or PDSCH and (E)PDCCH corresponds to PDCCH and/or EPDCCH.

4.1 Frame Structure

Figure 15:
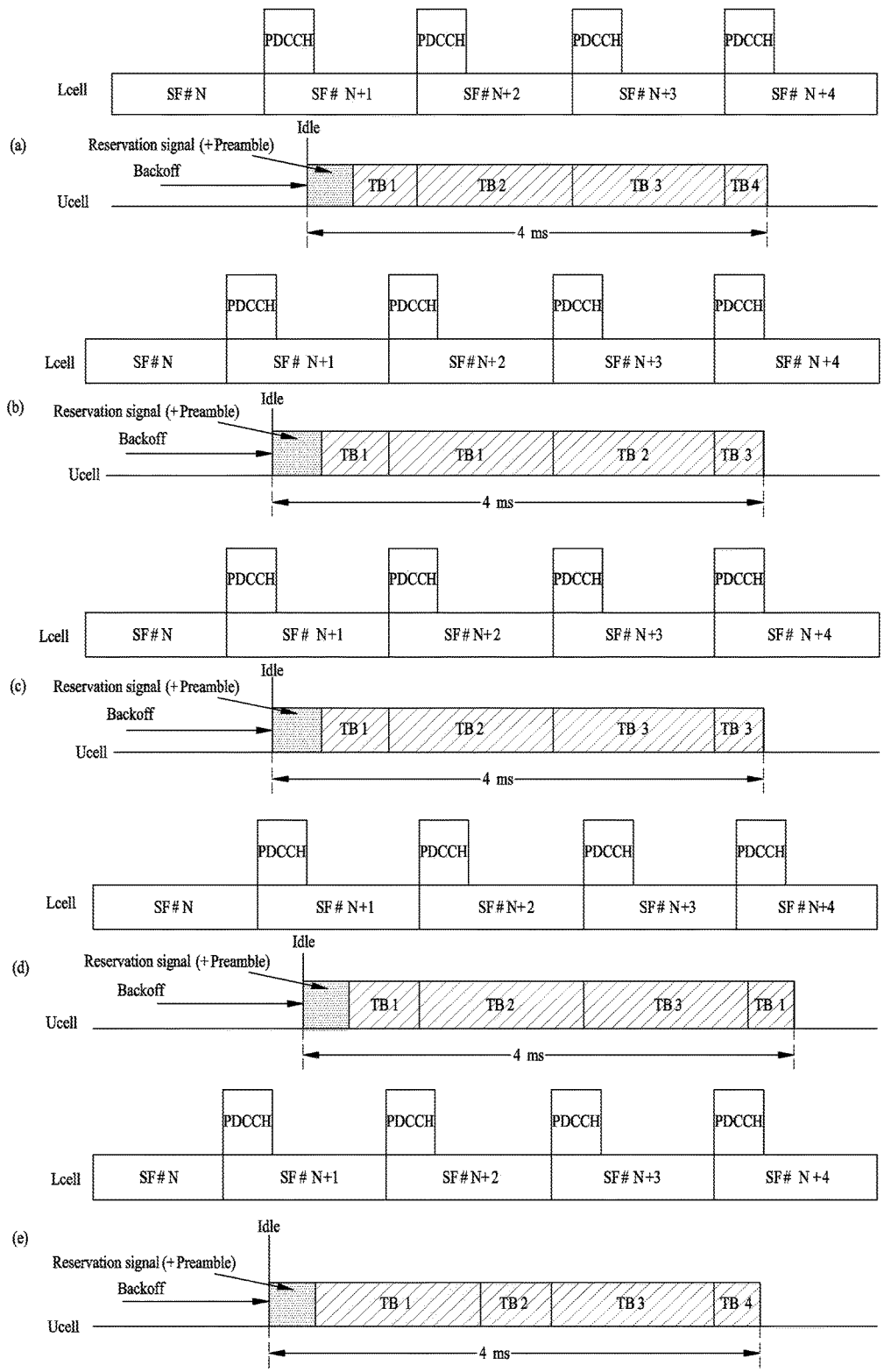
FIG. 15 is a diagram for explaining a subframe structure capable of being applied to a sPDSCH.

FIG. 15 is a diagram for explaining a subframe structure capable of being applied to a sPDSCH.

In FIG. 15, assume a case that a length of TxOP duration corresponds to 4ms (i.e., 4TTI). And, one subframe (pSF and whole SF) can configure a single transmission unit by each of subframes or a combination thereof. In this case, for clarity, assume that one SF is configured by one PDSCH. Yet, depending on an implementation scheme, one SF can include a plurality of PDSCHs. If one SF includes one PDSCH, a pSF can be used as a meaning identical to a sPDSCH.

FIG. 15(a) is a diagram for explaining a first type frame structure. Referring to FIG. 15(a), an eNB starts a backoff procedure for performing CS in an SF #N of a UCell and may be able to check that a channel is idle in the middle of an SF #N+1. Hence, the eNB starts to transmit a reservation signal in the SF #N+1 of the UCell and starts to transmit PDSCH at predetermined timing. If channel occupation time is configured by 4 ms in the UCell, the sPDSCH is transmitted in the SF #N+1 and an SF #N+4 and 4 SFs can be configured to transmit a different TB (transport block). In particular, TxOP duration can be configured by a TB1, a TB2, a TB3, and a TB4.

FIG. 15(b) is a diagram for explaining a second type frame structure. In case of the first type frame structure, since a length of the sPDSCH of the SF #N+1 is too short, a reference signal (RS) is not sufficient. Hence, it may be difficult for a UE to successfully receive data. In order to supplement this, as shown in FIG. 15(b), it may be able to transmit sPDSCH of the SF #N+1 and PDSCH of the SF #N+2 by configuring the sPDSCH of the SF #N+1 and the PDSCH of the SF #N+2 as a single TB (e.g., TB1).

Or, it may be able to configure and transmit the same TB only when a length of sPDSCH is less than a specific threshold.

Or, it may be able to configure and transmit the same TB only when a code rate of sPDSCH is greater than a specific threshold.

FIG. 15(c) is a diagram for explaining a third type frame structure. In case of the last SF (e.g., SF #N+4) in a DL burst, since a length of sPDSCH is too short, it may have a problem that an RS is not sufficiently transmitted. In this case, as shown in FIG. 15(c), it may be able to transmit PDSCH of SF #N+3 and sPDSCH of SF #N+4 by configuring the PDSCH of SF #N+3 and the sPDSCH of SF #N+4 as a single TB (i.e., TB3).

Yet, in case of the frame structures shown in FIGS. 15(b) and (c), since a TB of sPDSCH and a TB of a different PDSCH are identically configured, reliability of legacy PDSCH increases. However, the frame structures may have a demerit in that it is unable to increase a peak data rate.

FIG. 15(d) is a diagram for explaining a fourth type frame structure. In order to supplement the demerits of the second and the third type frame structures, the fourth type frame structure configures two sPDSCHs capable of being existed at the front and the rear side of channel occupation time (i.e., 4 ms) as a single TB instead of configuring sPDSCH and a different PDSCH as the same TB. In particular, a single TB (i.e., TB1) is mapped to sPDSCH, which is assigned to a pSF, in a manner of being divided and PDSCH can be transmitted to the whole SFs.

Compared to the second type and the third type frame structures, the fourth type frame structure has a merit in terms of a peak data rate. Yet, since it is necessary for a UE to buffer data of the SF #N+1 until the SF #N+1, if a buffer size of the UE is small, it may have an implementation problem.

FIG. 15(e) is a diagram for explaining a fifth type frame structure. In a legacy LTE-A system, an eNB pre-configures PDSCH to be transmitted during an SF before the SF starts. The eNB transmits the preconfigured PDSCH from a predetermined timing of the SF.

Yet, in case of an LAA system, although PDSCH is configured in advance before an SF starts, it may be able to transmit data only when a UCell is in an idle state after an eNB performs CS and a backoff procedure. Hence, it may be able to start to transmit sPDSCH from timing different from a determined timing of the SF. Hence, the sPDSCH may differ from the PDSCH which is configured in advance before the SF starts. Hence, it is necessary for the eNB and a UE to have an additional procedure for successfully transmitting and receiving the sPDSCH.

In order to supplement the demerit, the present invention proposes a method that a first SF of channel occupation time maintains a legacy SF form including the entire 1 ms and a second SF is configured by sPDSCH. Referring to FIG. 15(e), an SF, which has started transmission in the middle of the SF#N+1 in the UCell, is configured by a whole SF of 1 ms. In this case, the eNB can transmit preconfigured PDSCH without an additional procedure. And, since it is able to know a length of sPDSCH of the SF #N+2 based on a changed SF starting point, the eNB can configure sPDSCH for a TB 2 in advance before the SF #N+2 starts. Yet, since an SF boundary between the SF #N+1 and the SF #N+2 is not aligned between LCell and UCell, it may violate a legacy CA assumption. In FIG. 15(e), although a TB on the SF #N+1 PDSCH is different from a TB on the SF #N+2 sPDSCH, the TBs can be configured as the same TB.

In the following, a method of transmitting a reservation signal, a method of configuring sPDSCH, a method of scheduling UCell, a method of configuring DCI, a method of transmitting ACK/NACK, a method of estimating a channel, and the like are proposed for the aforementioned first to the fifth frame structures. The methods proposed in the embodiments of the present invention can also be applied to frame structures not including ending sPDSCH (e.g., sPDSCH of SF #N+4 shown in FIGS. 15(a) to (e)).

As a different aspect of the present embodiment, an eNB can determine whether or not an ending sPDSCH exists according to channel occupation time. For example, the eNB can configure the ending sPDSCH only when a channel equal to or less than X ms is occupied.

As a further different aspect of the present embodiment, a size of channel occupation time of the eNB may vary depending on channel environment and/or a system requirement. It may be able to terminate DL burst transmission prior to channel occupation time, which is permitted by configuring an ending sPDSCH. Hence, in order to reduce a time interval between contiguous DL bursts, it may be able to generate a timing gap to perform an LBT procedure before a next DL burst is transmitted.

For example, in FIG. 15(a), when sPDSCH including 12 OFDM symbols is transmitted in an SF #N+3, if LBT is successfully performed in the remaining 2 OFDM symbols of the SF #N+3, it may be able to transmit a next DL burst from the start of an SF #N+4.

4.2 Method of Transmitting Reservation Signal

If there is a limit on timing at which an eNB starts to transmit DL channels (e.g., (E)PDCCH, PDSCH, etc.) (e.g., every OFDM symbol boundary or partial OFDM symbol boundary), a timing gap may exists between backoff end timing of UCell and timing at which DL channel is actually transmitted.

In particular, since the eNB and a UE are unable to exclusively use the UCell and the eNB and the UE are able to access a channel based on contention, if the eNB transmits no signal during the timing gap, a different transmission node may attempt to transmit a signal during the timing gap. Hence, the eNB can transmit a reservation signal to occupy a channel during the timing gap in the UCell. The eNB can transmit the reservation signal in a manner of loading specific information on the reservation signal. In this case, the reservation signal can be transmitted according to a case that the start point of the DL channel corresponds to an SF boundary (or a predetermined specific timing) and a case that the start point of the DL channel is not an SF boundary.

For example, if the start point of the DL channel of the UCell corresponds to the SF boundary (or predetermined specific timing) of the PCell, the eNB can transmit a reservation signal for the purpose of occupying a channel only. In particular, if backoff ending timing is matched with the SF boundary (or predetermined specific timing), the eNB may not transmit the reservation signal. In this case, the UE may not attempt to receive the reservation signal to be transmitted before the SF boundary (or predetermined specific timing) or may not expect the existence of the reservation signal.

If the start point of the DL channel of the UCell is not the SF boundary (or predetermined specific timing), the eNB can transmit a reservation signal for the purpose of not only occupying a channel but also transmitting specific information. For example, the eNB can indicate that the DL channel starts at a point rather than the SF boundary (or predetermined specific timing) via the reservation signal. In this case, a maximum length and/or a minimum length of the reservation signal can be configured and the value(s) may correspond to predetermined values or values determined via higher layer signaling.

When the minimum length of the reservation signal is configured, if the timing gap between the backoff ending timing and the timing at which DL channel is actually transmitted is shorter than the minimum length, it may be unable to start the DL channel transmission at the timing at which the DL channel is actually transmitted.

When the maximum length of the reservation signal is configured, if the timing gap (e.g., X us) between the backoff ending timing and the timing at which DL channel is actually transmitted is longer than the maximum length (e.g., Y us) (X>Y), the eNB transmits a reservation signal during (X−Y) us for the purpose of occupying a channel only. And, the eNB can transmit a reservation signal (capable of being received by the UE) during the remaining period (Y us) to indicate that the DL channel starts at a point rather than the SF boundary (or predetermined specific timing).

In this case, if the reservation signal, which is transmitted to indicate that the start point of the DL channel is the SF boundary (or predetermined specific timing), a minimum length (Z us) is defined only. In this case, the UE may not expect the reception of the reservation signal. For example, if the start point of the DL channel is the SF boundary (or predetermined specific timing), it is necessary for the eNB to transmit a reservation signal equal to or longer than minimum Z us. If it is necessary for the UE to receive the reservation signal (e.g., AGC setting), the UE may attempt to receive the reservation signal.

The UE attempts to receive the reservation signal under the assumption that a DL channel starts at every SF boundary (or predetermined specific timing). If the UE fails to discover a DL channel at the SF boundary (or predetermined specific timing), the UE attempts to receive a reservation signal, which is transmitted to indicate that a DL channel starts at a point rather than the SF boundary (or predetermined specific timing). If the reservation is successfully discovered, the UE may attempt to receive a DL channel at a point rather than the SF boundary (or predetermined specific timing) after the reservation signal is received. The above-mentioned reservation signal transmission/reception method can be applied to a cross-carrier scheduled UE, a self-carrier scheduled UE, or a hybrid scheduled UE. In this case, the hybrid scheduled UE may correspond to a UE capable of performing cross-carrier scheduling or self-carrier scheduling in every subframe.

4.3 sPDSCH Structure 4.3.1 Method of Configuring sPDSCH Through Puncturing

Figure 16:
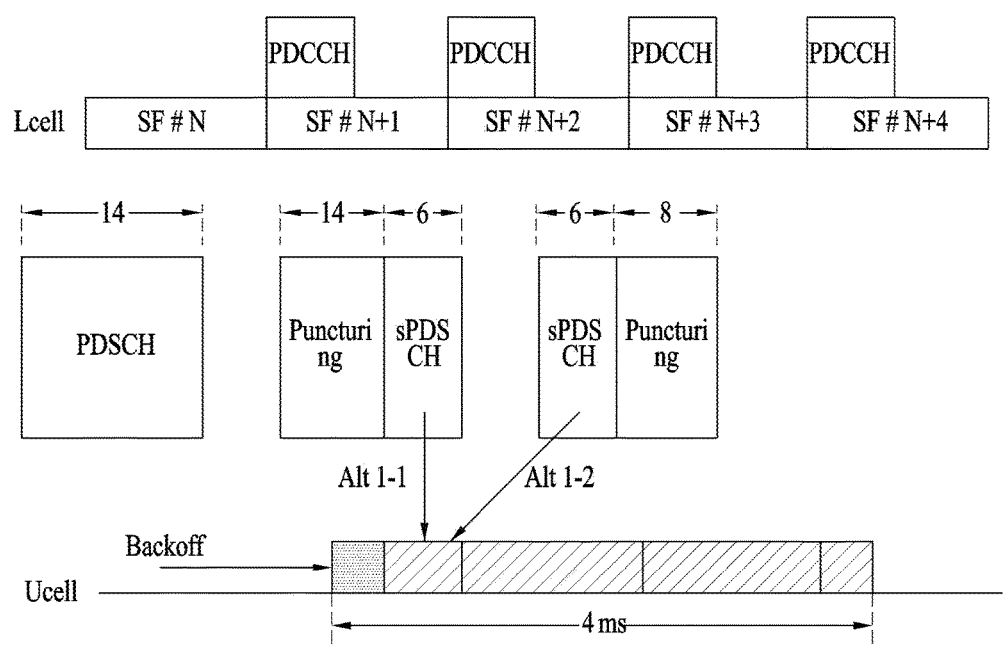
FIG. 16 is a diagram for explaining one of methods of configuring a sPDSCH.

FIG. 16 is a diagram for explaining one of methods of configuring a sPDSCH.

In LTE-A system, an eNB preconfigures PDSCH to be transmitted during an SF immediately before the SF starts. In the aforementioned first to the fourth type frame structures, a TB1 in the SF #n+1 can be configured by performing puncturing on a part that actual transmission is not performed among the preconfigured PDSCH.

For example, referring to FIG. 16, when the preconfigured PDSCH corresponds to 14 OFDM symbols, if sPDSCH corresponds to 6 symbols, an eNB can transmit the first 8 symbols in a manner of puncturing the 8 symbols (refer to SF #N+1, Alt. 1-1 of FIG. 16). As a different method, when the preconfigured PDSCH corresponds to 14 OFDM symbols, if sPDSCH corresponds to 6 symbols, the eNB can transmit 8 symbols by shifting the 8 symbols after puncturing the latter 8 symbols (refer to SF #N+1, Alt 1-2 of FIG. 16).

Since LTE-A system performs frequency-first mapping on PDSCH, (when redundancy version (RV) corresponds to 0) it is highly probable for a symbol positioned at the front in time to transmit a systematic bit. Hence, when the PDSCH for the Alt. 1-1 scheme is configured in FIG. 16, it may be able to introduce a mapping method that a symbol positioned at the back transmits data first after frequency-first mapping is performed. Or, while time-first mapping is performed, the eNB can perform resource mapping from a symbol positioned at the back first instead of a legacy method that performs resource mapping from a symbol positioned at the front first.

As shown in the Alt. 1-2 scheme of FIG. 16, if the eNB configures a pSF by shifting punctured symbols, a position of a DM-RS can be configured by assuming a special SF of a size most similar to a size of the pSF.

For example, when a pSF is configured by 7 OFDM symbols, since a size of a special SF having the most similar size corresponds to 6 OFDM symbols, the eNB configures a DM-RS corresponding to a special subframe configuration 9, performs puncturing on the latter 7 OFDM symbols, and shifts the first 7 OFDM symbols to configure a DM-RS for a pSF.

Figure 17:
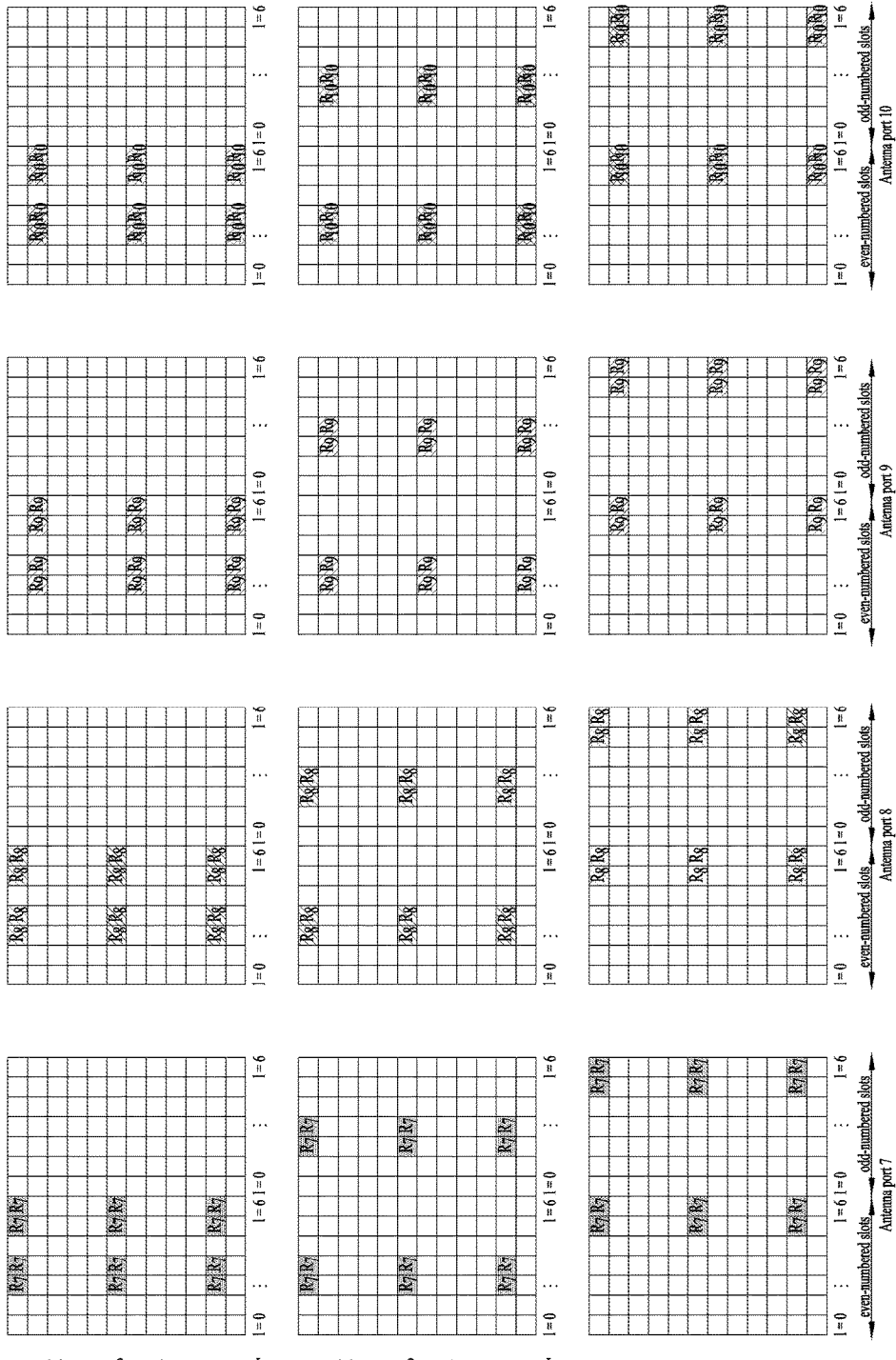
FIG. 17 is a diagram for a DM-RS capable of being applied to an LAA system in LTE-A system.

If there are two special SFs of a size most similar to a size of a pSF, it may be able to define a rule that a special SF of a size smaller than the size of the pSF is assumed. For example, if the size of the pSF corresponds to 13 OFDM symbols, the eNB may assume a special SF configuration 4 (i.e., 12 OFDM symbols) or may configure a DM-RS by assuming a whole SF. As a different method, the eNB may assume a special SF configuration consisting of minimum OFDM symbols bigger than the size of the pSF or may configure a DM-RS by assuming a special SF configuration consisting of maximum OFDM symbols smaller than the size of the pSF. FIG. 17 is a diagram for a DM-RS capable of being applied to an LAA system in LTE-A system. In particular, the aforementioned DM-RSs may use DM-RSs shown in FIG. 17.

A TB1 in the SF #N+1 and the SF #N+4 of the fourth type frame structure can be configured in a manner of being punctured in the PDSCH preconfigured at the timing of SF #N+1. Assume a case that the preconfigured PDSCH corresponds to 14 OFDM symbols, a reservation signal corresponds to 3 symbols, the TB1 of the SF #N+1 corresponds to 6 symbols, and the TB1 of the SF #N+4 corresponds to 5 symbols.

Alt. 2-1) Scheme

The eNB punctures the first 8 symbols of the preconfigured PDSCH and then transmits the latter 6 symbols of the preconfigured PDSCH in the SF #N+1. The eNB punctures the latter 9 symbols of the preconfigured PDSCH and then transmits the first 5 symbols of the preconfigured PDSCH in the SF #N+4.

Alt. 2-2) Scheme

The eNB punctures the latter 8 symbols of the preconfigured PDSCH and then transmits the first 6 symbols of the preconfigured PDSCH in the SF #N+1 (i.e., shift the punctured 8 symbols). The eNB punctures the first 9 symbols of the preconfigured PDSCH and then transmits the latter 5 symbols of the preconfigured PDSCH in the SF #N+4 (i.e., shift the punctured 9 symbol).

Alt. 2-3) Scheme

The eNB punctures the latter 8 symbols of the preconfigured PDSCH and then transmits the first 6 symbols of the preconfigured PDSCH in the SF #N+1 (shift the punctured 8 symbol). The eNB punctures the first 6 symbols and the latter 3 symbols of the preconfigured PDSCH and then transmits the middle 5 symbols of the preconfigured PDSCH in the SF #N+4 (shift 6 symbols). In the legacy LTE-A system, as mentioned in the foregoing description, it is highly probable for a symbol positioned at the front in time to transmit a systematic bit. In particular, compared to the Alt. 2-2) scheme, the Alt. 2-3) scheme may be able to increase a success rate of sPDSCH.

4.3.2 Method of Configuring sPDSCH Using Rate Matching

In the foregoing description, methods of configuring sPDSCH via puncturing have mainly been explained. Yet, the sPDSCH can also be configured via rate matching. In the following, methods of configuring sPDSCH using rate matching are explained.

In LTE-A system, an eNB divides a TB delivered from MAC layer into one or more code blocks (CBs), applies turbo coding to each of the CBs, and stores encoded CB(s) in a circular buffer. If bits necessary for transmitting PDSCH in a normal SF of 1ms-length are calculated, the eNB performs rate matching on bits stored in the circular buffer according to a CB, performs modulation and RE mapping.

Although sPDSCH is transmitted because a backoff operation ends at a point rather than SF boundary in UCell, the eNB can transmit the sPDSCH by performing a series of procedures including rate matching, modulation, RE mapping and the like on the bits stored in the circular buffer using the same method.

Yet, since a slot unit for performing CCA may have a very short length, if it is unable to process a series of procedures including rate matching, modulation, RE mapping and the like within a very short time period, a problem may occur. For example, when a CCA slot operates in a unit of 9 us, if time taken for determining an idle state of a channel and configuring sPDSCH is longer than 9 us, interference from a different node may occur due to the characteristic of an unlicensed band operation.

In order to solve the problem, the eNB configures CB(s) for transmitting a normal SF of 1ms-length in advance. As a result of backoff, if it is necessary to transmit sPDSCH, the eNB extracts data from the CB(s), performs puncturing or rate matching on the data, and configures sPDSCH. By doing so, it may be able to reduce processing time.

In this case, the CB(s) for transmitting the normal SF can be stored in an additional buffer. When the CB(s) for transmitting the normal SF are stored, the eNB can store the CB(s) in a unit of a bit or a unit of a modulation symbol.

Figure 18:
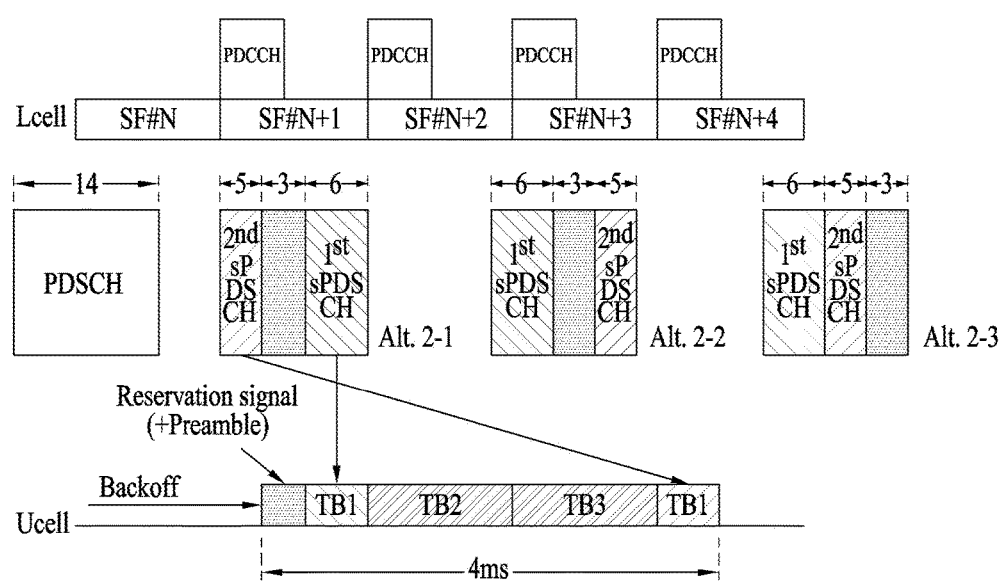
FIG. 18 is a diagram for explaining one of methods of configuring a sPDSCH using a rate-matching scheme and FIG. 19 is a diagram for comparing the number of bits of a CB for a sPDSCH, a CB size after rate matching, and a CB size after coding with each other.
Figure 19:
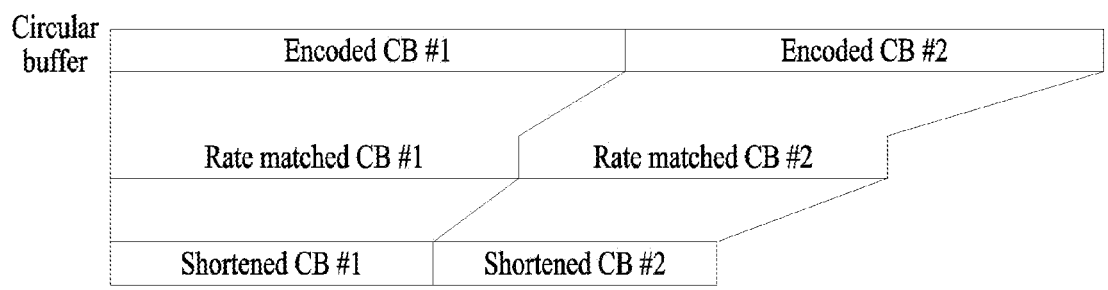

FIG. 18 is a diagram for explaining one of methods of configuring a sPDSCH using a rate-matching scheme and FIG. 19 is a diagram for comparing the number of bits of a CB for a sPDSCH, a CB size after rate matching, and a CB size after coding with each other.

Referring to FIG. 18, rate matched CB(s), which are generated under the assumption of 1 ms PDSCH transmission, are configured as the CBs for transmitting a normal SF. In case of transmitting sPDSCH, the eNB performs puncturing or rate matching on preconfigured bits (or modulation symbols) to transmit the sPDSCH.

As a different method, CB(s) are configured in a form of RE mapping. In case of transmitting sPDSCH, the eNB can transmit the sPDSCH by performing puncturing or rate matching on a specific OFDM symbol(s) according to a CB.

4.4 Method of Scheduling sPDSCH

In a CA situation of LTE-A system, an eNB generally performs scheduling via (E)PDCCH of SF #N+1 for UCell transmission of the SF #N+1. When the scheduling is performed at the timing of the SF #N+1 before sPDSCH starts, it is referred to as pre-scheduling.

In case of performing the pre-scheduling, although (E)PDCCH is transmitted by the eNB, if a channel is busy during a corresponding SF, the eNB may not transmit sPDSCH. And, since the eNB and/or the UE is unable to know a precise start point of the sPDSCH, it may be difficult to determine a TB size or MCS.

In consideration of this, the eNB may be able to perform scheduling on the sPDSCH at (E)PDCCH of the timing of SF #N+2 instead of the timing of SF #N+1 in the UCell. When the scheduling is performed after the start point of the sPDSCH, it is referred to as post-scheduling. In this case, the post-scheduling may correspond to cross-carrier scheduling, self-scheduling, or a combination thereof.

In case of performing the pre-scheduling, it may schedule (s)PDSCH positioned at the SF #N+1 only or schedule both (s)PDSCH positioned at the SF #N+1 and (s)PDSCH positioned at the SF #N+2 at (E)PDCCH of the SF #N+1 timing (e.g., in case of the same TB).

Similarly, in case of performing the post-scheduling, the eNB may schedule (s)PDSCH positioned at the SF #N+1 only or schedule both (s)PDSCH positioned at the SF #N+1 and (s)PDSCH positioned at the SF #N+2 at (E)PDCCH of the SF #N+2 timing. Scheduling a specific SF of the same (or different) timing at the timing of the specific SF is identical to scheduling of a legacy LTE-A system (in terms of DCI configuration).

In the following, methods of scheduling sPDSCH and PDSCH for two or more SFs at specific SF timing are proposed.

Figure 20:
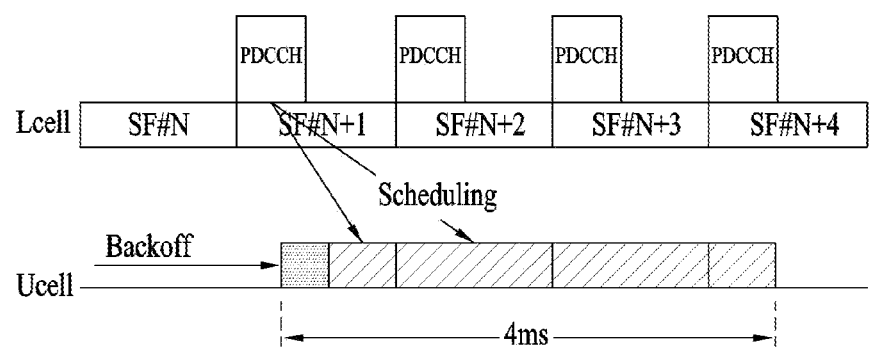
FIG. 20 is a diagram for explaining a method for an eNB to schedule two or more SFs in a UCell.

FIG. 20 is a diagram for explaining a method for an eNB to schedule two or more SFs in a UCell.

Referring to FIG. 20, if pre-scheduling and cross-carrier scheduling are configured, an eNB can schedule sPDSCH of SF #N+1, sPDSCH of SF #N+2, and PDSCH of UCell via (E)PDCCH of Pcell in an SF #N+1.

In the following, a case of utilizing common DCI to schedule two or more SFs and a case of utilizing individual DCI to schedule two or more SFs are explained. And, methods of transmitting ACK/NACK for each of the cases are explained. Unless there is a special citation, embodiments of the present invention can be identically applied to the pre-scheduling and the post-scheduling.

4.4.1 Method of Scheduling Two or More SFs Using Single DCI Format

Since an eNB schedules two or more SFs via single DCI, sPDSCH and PDSCH for two or more SFs are scheduled to the same UE and the same frequency resource is allocated to each UE according to an SF.

In this case, it is necessary for the eNB to inform the UE of information on whether the two or more SFs are scheduled at a time or are scheduled one by one. For example, the eNB can inform the UE of information on whether or not the two or more SFs are scheduled at a time by dividing DCI into a scrambling sequence, a CRC mask, and/or a search space. Of course, the eNB can inform the UE of the information by adding a new field to the DCI.

4.4.1.1 Scheduling Method and DCI Configuration in Case of the Same TB

As mentioned earlier with reference to FIG. 15, similar to a case of simultaneously scheduling two TB1 in FIG. 15(b), a case of simultaneously scheduling two TB3 in FIG. 15(c), and a case of configuring the TB1 and the TB2 as the same TB, when a single TB is transmitted in two SFs, it may be able to perform scheduling using single DCI.

Alt. 3-1) An eNB can commonly apply one RV to sPDSCH and PDSCH. And, the eNB can configure the sPDSCH and the PDSCH based on the same coded bit and transmit the sPDSCH and the PDSCH to a UE. In this case, the UE can recognize data received from the sPDSCH and the PDSCH as two TBs using the same RV.

Alt. 3-2) The eNB considers sPDSCH and PDSCH as a single PDSCH to generate and transmit a coded bit using a specific RV value. In this case, a UE can recognize data received from the sPDSCH and the PDSCH as a single TB.

Alt. 3-3) Although a single RV value is included in DCI, the eNB may be able to differently configure an RV value applied to the sPDSCH and the PDSCH according to a predetermined scheme. For example, when an RV order is determined by 0-2-3-1, if an RV field value of DCI corresponds to 0, the first (s)PDSCH assumes an RV value as 0 and the second (s)PDSCH can assume an RV value as 2.

Alt. 3-4) The UE may be able to determine whether an RV value is different or the same depending on a length (or code rate) of sPDSCH. For example, if the length of the sPDSCH is equal to or less than X1 (or if a code rate is equal to or greater than X2), the RV value is configured to be the same. Specifically, it may operate as Alt. 3-1) or Alt. 3-2). On the contrary, if the length of the sPDSCH is greater than X, it may operate as Alt. 3-3).

4.4.1.2 ACK/NACK Transmission in Case of the Same TB

In the following, when the same TB is transmitted via two SFs, methods for a UE to transmit ACK/NACK signal are explained.

Alt. 4-1) Since a UE transmits the same TB via two (s)PDSCHs, it may be able to transmit single ACK/NACK. For example, if scheduling time corresponds to SF #K, the UE may be able to transmit ACK/NACK to the eNB at SF #K+4 timing in response to the TB.

Alt. 4-2) As mentioned earlier in the Alt. 4-1) scheme, if the UE maintains legacy ACK/NACK transmission timing, since the same TB is transmitted over two (s)PDSCHs, time taken for performing decoding and configuring ACK/NACK may be insufficient. Hence, the UE can transmit ACK/NACK signal in a manner of considering processing time longer than the legacy timing. For example, if scheduling timing corresponds to SF #K, the UE can transmit ACK/NACK at SF #K+5 timing in response to the TB.

4.4.1.3 Scheduling Method and DCI Configuration in Case of a Different TB

An eNB can differently allocate at least one of information described in the following according to a TB.
HARQ process number
RV
NDI
DAI (TDD only)

For example, if two RV fields are included in single DCI, the front RV value corresponds to a value corresponding to the front TB and the latter RV value may correspond to a value corresponding to the latter TB. The rest of information can also be configured using the same scheme.

4.4.1.4 ACK/NACK Transmission in Case of a Different TB

Alt. 5-1) If scheduling time corresponds to SF #K, similar to LTE-A system, a UE can transmit ACK/NACK to an eNB at SF #K+4 timing in response to a corresponding TB. In this case, ACK/NACK for 2 TBs can be bundled.

Alt. 5-2) Since the Alt. 5-1) scheme uses ACK/NACK bundling, if one of two TBs succeeds in transmission, all of the TBs attempt retransmission. Hence, resource waste occurs. Hence, when scheduling time corresponds to SF #K, the UE transmits ACK/NACK at SF #K+4 timing in response to the front TB and transmits ACK/NACK at SF #K+5 timing in response to the latter TB.

Alt. 5-3) When scheduling time corresponds to SF #K, the UE can transmit ACK/NACK at SF #K+3 timing in response to the front TB and transmit ACK/NACK at SF #K+4 timing in response to the latter TB.

4.4.2 Method of Scheduling Two or More SFs Using Separate DCI

In the following, methods of scheduling (s)PDSCHs for two or more SFs are explained.

For example, in case of performing pre-scheduling, an eNB may be able to schedule all of (s)PDSCHs positioned at SF #N+1 and SF #N+2 on (E)PDCCH at SF #N+1 timing (e.g., in case of the same TB). In this case, it is necessary to inform the UE of whether (s)PDSCH positioned at SF #N+1 is scheduled on the (E)PDCCH or (s)PDSCH positioned at SF #N+2 is scheduled on the (E)PDCCH.

In this case, the (s)PDSCHs can be distinguished from each other using DCI. For example, the (s)PDSCHs can be distinguished using a scrambling sequence, a CRS mask, and/or a search space included in the DCI. As a different example, the (s)PDSCHs can be distinguished from each other by adding a new filed to the DCI. For example, if a value of the new field corresponds to 0, it indicates scheduling information on the front (s)PDSCH. If the value of the new field corresponds to 1, it indicates scheduling information on the latter (s)PDSCH.

4.4.2.1 Scheduling Method and DCI Configuration in Case of the Same TB

The same TB, which is transmitted via (s)PDSCHs of two SFs, is scheduled to the same UE and the same frequency resource can be allocated to each UE according to an SF. Hence, if one of two DCIs has resource allocation (RA) information, it is sufficient. In particular, an eNB loads RA information on one DCI only and loads additional information on another DCI.

For example, referring to FIG. 15(b), in case of performing post-scheduling, the eNB can perform scheduling on SF #N+1 sPDSCH and SF #N+2 PDSCH via (E)PDCCH at SF #N+2 timing. In this case, DCI on the SF #N+2 PDSCH includes legacy RA information and DCI on the SF #N+1 sPDSCH can include a length of the sPDSCH instead of the RA information.

4.4.2.2 ACK/NACK Transmission in Case of the Same TB

In the following, when the same TB is transmitted via two SFs, methods for a UE to transmit ACK/NACK signal are explained.

Since a UE transmits the same TB via two (s)PDSCHs, it may be able to transmit single ACK/NACK. For example, if scheduling time corresponds to SF #K, the UE may be able to transmit ACK/NACK to the eNB at SF #K+4 timing in response to the TB.

As mentioned earlier in the Alt. 4-1) scheme, if the UE maintains legacy ACK/NACK transmission timing, since the same TB is transmitted over two (s)PDSCHs, time taken for performing decoding and configuring ACK/NACK may be insufficient. Hence, the UE can transmit ACK/NACK signal in a manner of considering processing time longer than the legacy timing. For example, if scheduling timing corresponds to SF #K, the UE can transmit ACK/NACK at SF #K+5 timing in response to the TB.

4.4.2.3 ACK/NACK Transmission in Case of a Different TB

Alt. 6-1) When scheduling time corresponds to SF #K, ACK/NACK for the front TB and ACK/NACK for the latter TB can be transmitted at SF #K+4 timing and SF #K+5 timing, respectively.

Alt. 6-2) When scheduling time corresponds to SF #K, ACK/NACK for the front TB and ACK/NACK for the latter TB can be transmitted at SF #K+3 timing and SF #K+4 timing, respectively.

4.5 Ending sPDSCH Length

Alt. 7-1) If the number of PDSCH symbols corresponds to Y, the number of symbols of a reservation signal, which is transmitted at the time of starting DL burst, corresponds to Z, and the number of symbols of a starting sPDSCH corresponds to W in an SF to which an ending sPDSCH is allocated, the ending sPDSCH can be configured by the (Y-Z-W) number of symbols.

Alt. 7-2) If there is a limit on a length of sPDSCH, it may be difficult for an eNB to transmit all of the (Y-Z-W) number of symbols. For example, if the number of symbols of the sPDSCH corresponds to one selected from the group consisting of 4, 7, and 11, the number of symbols of the ending sPDSCH can be configured by the number of symbols smaller than (Y-Z-W) and closest to {4, 7, 11}. As a different example, the number of symbols of the sPDSCH can be restricted to all or a part of the number of symbols defined by a special SF configuration.

In case of the Alt. 7-1) and the Alt. 7-2) schemes, it is difficult for a UE to know a precise value of the Z. Hence, the Z is configured by a maximum length of a reservation signal and can be fixed irrespective of a length of a reservation signal to be actually transmitted. In this case, the Z may correspond to a value configured via higher layer signaling or a predefined value of a system.

4.5.1 Method of Indicating Ending sPDSCH Length

An eNB can explicitly inform a UE of a length of an ending sPDSCH using DCI. For example, the length of the ending sPDSCH can be indicated by adding a new field indicating the length to DCI transmitted on a UE-specific search space.

As a different example, the eNB can inform the UE of the length of the ending sPDSCH (PEnd) via DCI on a common search space, which is defined for a UCell in LAA system. In this case, the PEnd corresponds to a pSF which is transmitted while a part of the latter OFDM symbols is omitted. The PEnd corresponds to a pSF which ends prior to a subframe boundary of the UCell corresponding to a subframe boundary of a primary cell (Pcell) configured on a licensed band.

More specifically, in order for a UE to receive a sPDSCH in a wireless access system supporting an unlicensed band, the UE monitors a common search space to detect DCI including length information on sPDSCH set to a UCell supporting an unlicensed band. The UE detects and receives the DCI via the common search space and receives sPDSCH based on the length information included in the DCI.

In this case, the sPDSCH is received in a partial subframe (pSF, e.g., PEnd) and the pSF can be configured by a size smaller than a size of a normal subframe.

In this case, the sPDSCH can be scheduled using a cross-carrier scheduling scheme or a self-carrier scheduling scheme and the common search space can be configured in the UCell of the unlicensed band. In particular, the length information on the sPDSCH is transmitted via the common search space of the UCell all the time.

4.6 Method of Scheduling Starting sPDSCH and Ending sPDSCH in Fourth Type Frame Structure 4.6.1 Scheduling Method and DCI Configuration Alt. 8-1) Referring to FIG. 15($d$), since sPDSCH of SF #N+1 and sPDSCH of SF #N+2 correspond to the same TB, single DCI is sufficient enough for performing scheduling. Hence, in case of performing pre-scheduling, an eNB transmits DCI via (E)PDCCH of the SF #N+1. In case of performing post-scheduling, the eNB can transmit DCI via (E)PDCCH of the SF #N+2. It is not necessary for the eNB to additionally transmit DCI on sPDSCH of SF #N+4.

Alt. 8-2) In addition to the scheduling scheme proposed in the Alt. 8-1), it may be able to configure the eNB to transmit DCI on an ending sPDSCH in SF #N+4 or SF #N+5. The eNB can transmit the DCI in a manner of including length information of the ending sPDSCH in the DCI. In this case, since the same TB is transmitted via the starting sPDSCH and the ending sPDSCH, scheduling information (e.g., RA, RV, HARQ process number, and the like) on the starting sPDSCH may be identical to scheduling information on the ending sPDSCH.

If a UE receives DCI including a HARQ process number identical to a previous SF within 4 ms, the DCI can be recognized as DCI including information of the ending sPDSCH. In this case, a symbol length of the ending sPDSCH rather than legacy resource allocation information can be included in an RA field of the DCI to inform the UE of information on whether or not the ending sPDSCH exists and a length of the ending sPDSCH.

4.6.2 ACK/NACK Transmission

Alt. 9-1) A UE may transmit ACK/NACK in 4 ms on the basis of scheduling timing of an ending sPDSCH. In this case, ACK/NACK information corresponds to a result of performing data decoding by considering a starting sPDSCH and the ending sPDSCH as a single PDSCH. As mentioned earlier in Alt. 8-1), although an eNB does not additionally transmit DCI on sPDSCH of SF #N+4, the UE can transmit ACK/NACK in 4 ms on the basis of SF #N+4 (pre-scheduling) and transmit ACK/NACK in 4 ms on the basis of SF #N+5 (post-scheduling). In this case, a PUCCH resource in which the ACK/NACK is transmitted may correspond to a resource linked with DCI of the starting sPDSCH or a frequency resource specified in the DCI.

Alt. 9-2) In addition to the method proposed in Alt. 9-1), the UE can transmit ACK/NACK information on the starting sPDSCH in 4 ms on the basis of scheduling timing of the starting sPDSCH. In particular, the UE can transmit the ACK/NACK information on the starting sPDSCH and ACK/NACK information on the ending sPDSCH using a method identical to a method of a legacy LTE-A system. In this case, the ACK/NACK information on the ending sPDSCH corresponds to a result of performing data decoding by considering the starting sPDSCH and the ending sPDSCH as a single PDSCH.

4.7 Channel Estimation Method

In LTE-A system, a UE can perform channel estimation and data decoding by utilizing a cell-specific reference signal (CRS) or a UE-specific reference signal (URS) according to a transmission mode.

Yet, in case of the sPDSCH proposed by the present invention (e.g., refer to the $1^{st}$, $2^{nd}$, and $5^{th}$ type frame structure), since sufficient RSs are not transmitted in a corresponding SF, it may not guarantee successful data decoding on the sPDSCH to the UE. In the following, methods for solving the problem are explained.

Alt. 10-1) The UE may be able to increase a data decoding rate of sPDSCH by utilizing an RS included in PDSCH immediately before/after the sPDSCH.

For example, in case of a starting sPDSCH, the UE can perform channel estimation and data decoding by utilizing an RS, which is transmitted via PDSCH of a next SF. In case of an ending sPDSCH, the UE can utilize an RS of PDSCH included in previous SF. More specifically, the UE configures a virtual SF by utilizing PDSCH adjacent to sPDSCH and utilizes an RS-based channel estimation result, which is received via the same antenna port of the same PRB pair (or PRG), to perform data decoding.

RS power or RS power Vs. PDSCH power value may vary according to a subframe due to such a reason as LBT for multi-carrier or power backoff for transmitting high modulation order in a Scell of LAA system. However, if the UE is able to utilize an RS of PDSCH assigned to an adjacent SF in performing channel estimation on sPDSCH, the UE is able to assume that RS power of the sPDSCH and RS power of the PDSCH are identical to each other.

4.7.1 Case of Transmitting Both sPDSCH and PDSCH Based on CRS

First of all, assume a case that both sPDSCH included in a pSF and PDSCH of an adjacent SF are transmitted based on a CRS.

4.7.2 Case of Transmitting Both sPDSCH and PDSCH Based on URS

Subsequently, assume a case that both sPDSCH and PDSCH adjacent to the sPDSCH are transmitted based on a URS.

Referring to Table 8, in case of a URS, when a channel of a symbol is estimated from a channel of a different symbol, the channel can be estimated by a signal transmitted from the same antenna port only. Moreover, the signal is valid only when the signal is transmitted in the same PRB pair (or PRG) of the same SF.

And, when SF is changed, although the same PRB pair (or PRG) is allocated to the same UE, precoding of a URS may change due to a legacy LTE-A structure. In particular, in order to make sPDSCH and PDSCH of an adjacent SF have the same effective channel value, it is preferable to transmit the sPDSCH and the PDSCH of the adjacent SF using the same precoding scheme.

Hence, a UE assigned to the sPDSCH should also be assigned to the same PRB pair (PRG) of the adjacent PDSCH. And, it is necessary to have such a restriction that the same precoding is used for a URS of the PRB pair (or PRG). And, it is necessary to have such a restriction that URS transmit power on the sPDSCH and URS transmit power on the PDSCH are identical to each other.

TABLE 8

TS 36.211
    6.2.1 Resource grid
An antenna port is defined such that the channel over which a symbol on the antenna port is conveyed can be inferred from the channel over which another symbol on the same antenna port is conveyed. For MBSFN reference signals, positioning reference signals, UE-specific reference signals associated with PDSCH and demodulation reference signals associated with EPDCCH, there are limits given below within which the channel can be inferred from one symbol to another symbol on the same antenna port. There is one resource grid per antenna port. The set of antenna ports supported depends on the reference signal configuration in the cell:
- Cell-specific reference signals support a configuration of one, two, or four antenna ports and are transmitted on antenna ports $p = 0$, $p \in \{0,1\}$, and $p \in \{0,1,2,3\}$, respectively.
- UE-specific reference signals associated with PDSCH are transmitted on antenna port(s) $p = 5$, $p = 7$, $p = 8$, or one or several of $p \in \{7,8,9,10,11,12,13,14\}$. The channel over which a symbol on one of these antenna ports is conveyed can be inferred from the channel over which another symbol on the same antenna port is conveyed only if the two symbols are within the same subframe and in the same PRG when PRB bundling is used or in the same PRB pair when PRB bundling is not used.

Referring to Table 8 corresponding to a part of TS 36.211 standard document, in case of a CRS, when a UE estimates a channel of a symbol from a channel of a different symbol, the channel can be estimated by a signal transmitted from the same antenna port only. Hence, it is necessary for an eNB to transmit a CRS configured by the same antenna port of adjacent (s)PDSCHs.

Or, an antenna port of a CRS for configuring PDSCH should include at least an antenna port of a CRS for configuring sPDSCH.

And, power transmitted by the eNB from an antenna port(s) of the CRS constructing the sPDSCH needs to be identical to transmit power transmitted from an antenna port(s) of the CRS constructing the PDSCH for an antenna port(s) identical to the antenna port(s) of the CRS constructing the sPDSCH.

For example, if the antenna port of the CRS for configuring the sPDSCH corresponds to $\{1, 2\}$, the antenna port of the CRS for configuring the PDSCH should have $\{1, 2\}$ all the time. And, transmit power of $\{1,2\}$ corresponding to the antennas of the CRS constructing the sPDSCH needs to be identical to transmit power of $\{1,2\}$ corresponding to the antennas of the CRS constructing the PDSCH.

4.7.3 Method of Setting at Least One RS to sPDSCH

Alt. 10-2) If sPDSCH is transmitted based on a CRS and PDSCH adjacent to the sPDSCH is transmitted based on a URS only without transmitting the CRS, the sPDSCH may have no CRS when a length of the sPDSCH is very short. In order to solve this problem, it may be able to configure the sPDSCH to have at least one RS (RS including a CRS and/or a specific URS).

A starting sPDSCH is explained as an example. In case of a CRS antenna port 0, since the last symbol corresponds to $12^{th}$ symbol, it may be able to configure sPDSCH consisting of the last two (or one) symbols not to be transmitted.

4.7.4 Method of Estimating Channel Using Preamble

Alt. 10-3) It may be able to configure an eNB to transmit a preamble at every start point of sPDSCH. A UE can perform channel estimation and data decoding using the preamble. For example, in order for the UE to perform channel estimation via a preamble, an antenna port from which the preamble is transmitted can be configured to be identical to an antenna port from which sPDSCH is transmitted. In order to successfully receive MIMO transmission, it may be necessary to have an orthogonal preamble according to a layer.

The aforementioned Alt. 10-1) and the Alt. 10-3) schemes can be easily applied to the fourth type frame structure. For example, in case of the Alt. 10-1) scheme, a CRS of a starting sPDSCH and a CRS of an ending sPDSCH can be configured by the same antenna port. Or, it may be necessary to have such a restriction as precoding used for a URS of the starting sPDSCH and precoding used for a URS of the ending sPDSCH are identical to each other. As a different example, in case of the Alt. 10-3) scheme, antenna ports transmitting a preamble, the starting sPDSCH, and the ending sPDSCH can be configured to be the same.

4.8 Tracking Subframe (tSF)

In order to perform tracking or time-frequency fine synchronization between an eNB and a UE, the eNB can transmit a subframe including a CRS port 0 (in $0^{th}$, $4^{th}$, $7^{th}$, and $11^{th}$ OFDM symbols) or all CRS ports corresponding to the maximum number of ports capable of being used by the eNB to DL TX burst (a contiguous transmission unit of a transmission node).

In the embodiments of the present invention, the subframe is referred to as a tracking SF (tSF). Having received the tracking SF, the UE can be configured to perform blind detection on CSI-RS/CSI-IM for a period less than X ms including the tracking SF only.

The UE may expect that sPDSCH is to be transmitted within the period less than X ms from the tracking SF. In the aspect of the eNB, the eNB can transmit the tracking SF in all SFs rather than the sPDSCH and can be configured to transmit the tracking SF in a specific SF only among the DL TX burst.

Assume a case that the tracking SF is transmitted in a specific subframe only among the DL TX burst. For example, the tracking SF can be transmitted in a first subframe of the DL TX burst except a subframe in which sPDSCH is transmitted. Or, the tracking SF can be configured in a partial subframe among 'DRX on duration' or a first subframe where 'DRS on duration' and the DL TX burst are overlapped except a subframe in which the sPDSCH is transmitted in accordance with timing at which a DRX UE is woke up.

In order to inform the UE of the tracking SF, the eNB may be able to utilize one selected from the group consisting of PCFICH of a corresponding LAA SCell, PHICH, common DCI of a PCell, and UE-specific DCI.

Or, the eNB can utilize the indication whenever the tracking SF is transmitted in the first subframe of the DL TX burst.

Or, the eNB can transmit the indication indicating the tracking SF only when the tracking SF is transmitted in the middle of the DL TX burst in accordance with the timing at which the DRX UE is woke up.

Or, the eNB may be able to configure the tracking SF to be discovered depending on blind detection of the UE without the indication indicating the transmission of the tracking SF.

As mentioned in the foregoing description, the UE may expect that sPDSCH is to be transmitted within the period less than X ms from the timing at which the tracking SF is discovered. Yet, if the UE has no correct indication indicating the timing at which the tracking SF is transmitted, the UE can basically perform blind detection on all SFs to detect the tracking SF. In particular, in order to reduce implementation complexity of the UE that performs blind detection on the tracking SF and blind detection on the sPDSCH, the eNB can transmit an indication indicating that the blind detection on the sPDSCH is to be performed after a specific SF. For example, the indication may correspond to an indication indicating the last SF of the DL TX burst.

The UE preferentially performs blind detection on the tracking SF. When the tracking SF is detected, if the indication indicating the last SF of the DL TX burst is detected during X ms from the tracking SF, the UE can only expect the sPDSCH within X ms from the last SF of the DL TX burst.

For example, if X corresponds to 10 ms, the tracking SF is detected in SF #N, and an indication indicating the last SF of the DL TX burst is discovered in SF #N+3, the UE can perform blind detection on the existence of the sPDSCH during a period between SF#N+4 and SF#N+10. In this case, the indication indicating to perform the blind detection on the sPDSCH after the specific SF can be transmitted using PCFICH of LAA SCell, PHICH, common DCI of Pcell, or UE-specific DCI.

As mentioned in the foregoing description, the eNB and the UE may use the PHICH of the LAA Scell for at least one of the usages described in the following.

(1) Indicating whether or not the tracking SF is transmitted in the first SF of the DL TX burst (2) Indicating the tracking SF transmitted in the middle of the DL TX burst in accordance with the timing at which the DRX UE is woke up (3) Indicating to perform blind detection on the sPDSCH after the specific SF (4) Length of the sPDSCH (5) Indicating whether or not the sPDSCH is transmitted at the first or the last of the DL TX burst (6) In this case, the PHICH can be designed in consideration of the following.

(i) Assume that PHICH duration always corresponds to 1 OFDM (ii) Assume that there is a single PHICH group all the time. (i.e., the eNB uses one (e.g., code 0 and I phase) of combinations between specific Walsh-Hadamard (WH) code and I/Q phase in the PHICH group and information is transmitted to the UE by performing BPSK modulation on the information)

(iii) If two or more information are loaded on the PHICH, additional PHICH group, WH code (without additional PHICH group), or I/Q phase is distinctively used.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB informs a UE of information on whether to apply the proposed methods via a predefined signal (e.g., physical layer signal or higher layer signal).

5. Apparatuses

Figure 21:
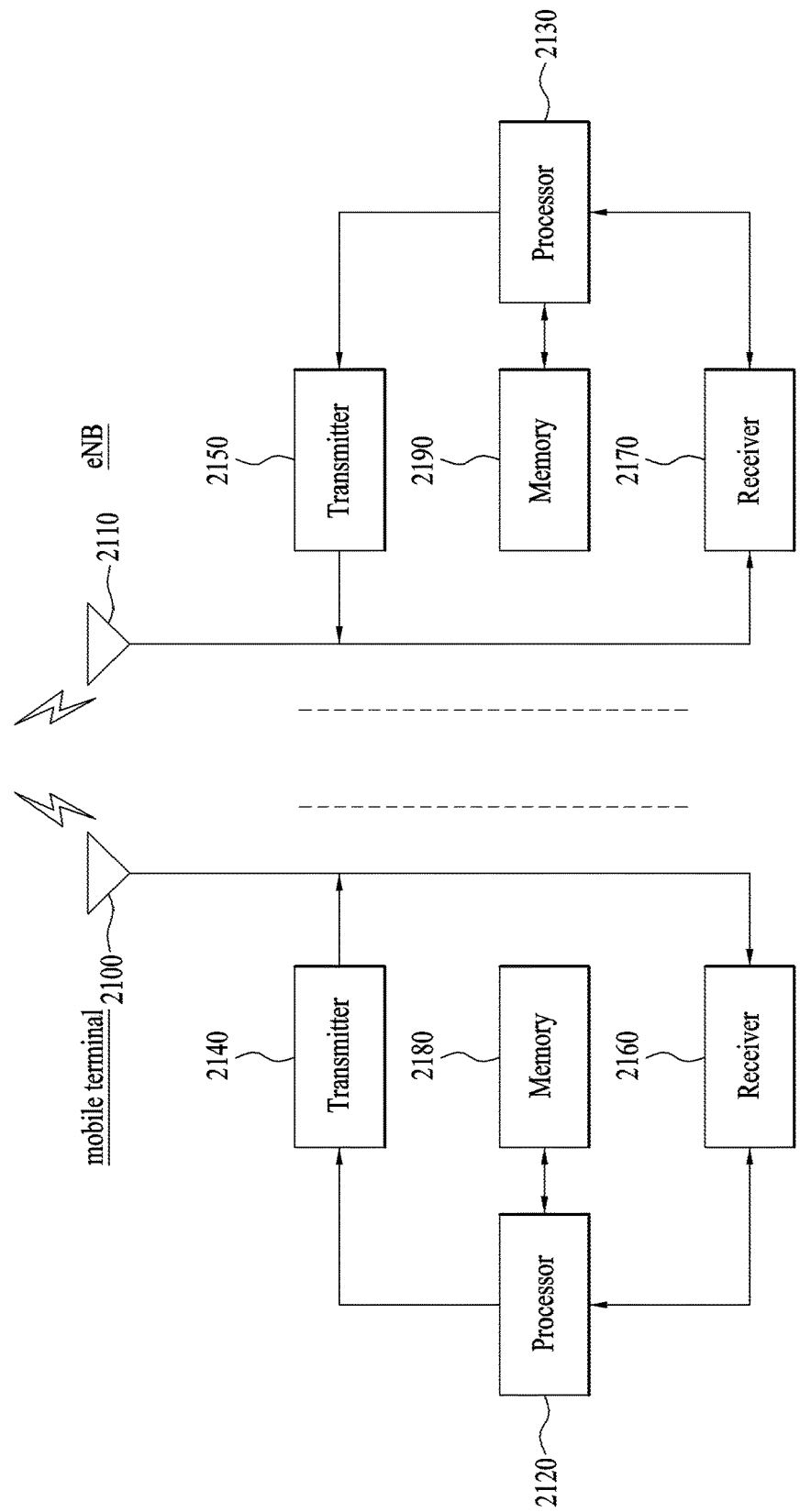
FIG. 21 is a diagram for a device capable of implementing the methods mentioned earlier in FIGS. 1 to 20.

Apparatuses illustrated in FIG. 21 are means that can implement the methods described before with reference to FIGS. 1 to 20.

A UE may act as a transmitter on a UL and as a receiver on a DL. An eNB may act as a receiver on a UL and as a transmitter on a DL.

That is, each of the UE and the eNB may include a transmitter 2140 or 2150 and a receiver 2160 or 2170, for controlling transmission and reception of information, data, and/or messages, and an antenna 2100 or 2110 for transmitting and receiving information, data, and/or messages.

Each of the UE and the eNB may further include a processor 2120 or 2130 for implementing the afore-described embodiments of the present disclosure and a memory 2180 or 2190 for temporarily or permanently storing operations of the processor 2120 or 2130.

It is able to perform the embodiments of the present invention using configuration elements and functions of the UE and the eNB. For example, a processor of the eNB configures a backoff counter value to determine whether or not a section corresponds to a section to which backoff is permitted in each TTI (or SF). If a section corresponds to a backoff-permitted section, the processor of the eNB performs CS by controlling a transmitter and/or a receiver. When the CS is completed, the processor of the eNB can decrease the backoff counter value by 1. If the backoff counter value becomes 0, the processor of the eNB can transmit/receive a reservation signal and/or data to/from the UE via UCell.

In order to transmit length information of an ending sPDSCH to the UE, the processor of the eNB may use DCI transmitted in a common search space of the UCell or Pcell. A processor of the UE monitors the common search space to receive DCI. The processor of the UE is able to clearly know a size of the ending sPDSCH based on the length information included in the DCI and may be able to precisely decode the ending sPDSCH.

The transmitters and the receivers of the UE and the eNB may perform a packet modulation/demodulation function for data transmission, a high-speed packet channel coding function, OFDMA packet scheduling, TDD packet scheduling, and/or channelization. Each of the UE and the eNB of FIG. 21 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2180 or 2190 and executed by the processor 2120 or 2130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for receiving a shortened physical downlink shared channel (sPDSCH) in a wireless access system supporting an unlicensed band, the method comprising:
monitoring a common search space to detect downlink control information (DCI);
receiving the DCI simultaneously scheduling the sPDSCH and a physical downlink shared channel (PDSCH),
wherein the DCI includes length information for the sPDSCH and a redundancy version (RV) value for the sPDSCH and the PDSCH;
receiving the sPDSCH at a subframe number N+1 and the PDSCH at a subframe number N+2 based on the DCI including the length information and the RV value,
wherein one transport block is received via the sPDSCH and the PDSCH, and
wherein the sPDSCH and the PDSCH are received through an unlicensed band cell (UCell); and
transmitting an acknowledgement/negative acknowledgement (ACK/NACK) value for the sPDSCH and the PDSCH based on the RV value,
wherein the sPDSCH is received in a partial subframe (pSF),
wherein the pSF is configured to have a smaller size than a normal subframe of a licensed band, and
wherein the licensed band is a Long Term Evolution-Advanced (LTE-A) band and the unlicensed band is a WiFi band or a Bluetooth (BT) band.

2. The method of claim 1, wherein the sPDSCH corresponds to an ending sPDSCH which ends prior to a subframe boundary of the UCell corresponding to a subframe boundary of a primary cell (Pcell) configured on a licensed band.

3. The method of claim 1, wherein the sPDSCH is scheduled by a self-carrier scheduling scheme or a cross-carrier scheduling scheme.

4. The method of claim 1, wherein the common search space is configured in the UCell of the unlicensed band.

5. A user equipment (UE) for receiving a shortened physical downlink shared channel (sPDSCH) in a wireless access system supporting an unlicensed band, the UE comprising:

a transmitter;
a receiver; and
a processor configured to support reception of the sPDSCH,
wherein the processor is further configured to:
  control the receiver to monitor a common search space to detect downlink control information (DCI),
  control the receiver to receive the DCI simultaneously scheduling the sPDSCH and a physical downlink shared channel (PDSCH),
  wherein the DCI includes length information for the sPDSCH and a redundancy version (RV) value for the sPDSCH and the PDSCH,
  control the receiver to receive the sPDSCH at a subframe number N+1 and the PDSCH at a subframe number N+2 based on the DCI including the length information and the RV value,
  wherein one transport block is received via the sPDSCH and the PDSCH, and
  wherein the sPDSCH and the PDSCH are received through an unlicensed band cell (UCell)),
  control the transmitter to transmit an acknowledgement/negative acknowledgement (ACK/NACK) value for the sPDSCH and the PDSCH based on the RV value,
wherein the sPDSCH is received in a partial subframe (pSF),
wherein the pSF is configured to have a smaller size than a normal subframe of a licensed band, and
wherein the licensed band is a Long Term Evolution-Advanced (LTE-A) band and the unlicensed band is a WiFi band or a Bluetooth (BT) band.

6. The UE of claim 5, wherein the sPDSCH corresponds to an ending sPDSCH which ends prior to a subframe boundary of the UCell corresponding to a subframe boundary of a primary cell (Pcell) configured on a licensed band.

7. The UE of claim 5, wherein the sPDSCH is scheduled by a self-carrier scheduling scheme or a cross-carrier scheduling scheme.

8. The UE of claim 5, wherein the common search space is configured in the UCell of the unlicensed band.

* * * * *